United States Patent
Ramadas et al.

(10) Patent No.: US 12,003,575 B2
(45) Date of Patent: Jun. 4, 2024

(54) ROUTING OF SENSITIVE-INFORMATION UTTERANCES THROUGH SECURE CHANNELS IN INTERACTIVE VOICE SESSIONS

(71) Applicant: Optum, Inc., Minnetonka, MN (US)

(72) Inventors: Devikiran Ramadas, Bangalore (IN); Ninad D. Sathaye, Bangalore (IN); Gregory J. Boss, Saginaw, MI (US); Raghav Bali, New Delhi (IN)

(73) Assignee: OPTUM, INC., Minnetonka, MN (US)

( * ) Notice: Subject to any disclaimer, the term of this patent is extended or adjusted under 35 U.S.C. 154(b) by 0 days.

(21) Appl. No.: 17/652,057

(22) Filed: Feb. 22, 2022

(65) Prior Publication Data

US 2023/0269291 A1 Aug. 24, 2023

(51) Int. Cl.
*H04L 67/10* (2022.01)
*G10L 15/18* (2013.01)
*G10L 25/72* (2013.01)

(52) U.S. Cl.
CPC .......... *H04L 67/10* (2013.01); *G10L 15/1815* (2013.01); *G10L 25/72* (2013.01)

(58) Field of Classification Search
CPC ...... H04L 67/10; G01L 15/1815; G01L 25/72
See application file for complete search history.

(56) References Cited

U.S. PATENT DOCUMENTS

| | | | |
|---|---|---|---|
| 7,502,741 | B2 | 3/2009 | Finke et al. |
| 8,244,531 | B2 | 8/2012 | Erhart et al. |

(Continued)

FOREIGN PATENT DOCUMENTS

| | | |
|---|---|---|
| EP | 2924966 B1 | 4/2020 |
| EP | 3386165 B1 | 9/2021 |

(Continued)

OTHER PUBLICATIONS

Claburn, "Is it possible to control Amazon Alexa, Google Now using inaudible commands? Absolutely", The Register, Retrieved Apr. 13, 2021 from: https://www.theregister.com/2017/08/25/amazon_alexa_answers_inaudible_commands/, Aug. 25, 2017, 2 pp.

(Continued)

*Primary Examiner* — Jefferey F Harold
*Assistant Examiner* — Franklin S Andramuno
(74) *Attorney, Agent, or Firm* — Shumaker & Sieffert, P.A.

(57) ABSTRACT

An example method includes obtaining first audio data representing one or more initial utterances during an interactive voice session with an interactive voice system (IVS); generating, based on the first audio data, a prediction regarding whether a subsequent utterance of the user in the interactive voice session will contain sensitive information; obtaining second audio data representing the subsequent utterance; determining, based on the prediction, whether to transmit the second audio data to the IVS via a first communication channel; based on a determination not to transmit the second audio data to the IVS via the first communication channel: transmitting third audio data to the IVS via the first communication channel in place of the second audio data; and transmitting the second audio data to a server via a second communication channel that bypasses the IVS.

16 Claims, 12 Drawing Sheets

(56) References Cited

U.S. PATENT DOCUMENTS

| | | | |
|---|---|---|---|
| 8,433,915 | B2 | 4/2013 | Doren |
| 8,572,758 | B1 | 10/2013 | Clifford |
| 9,697,837 | B2 | 7/2017 | Hefetz |
| 9,787,835 | B1 | 10/2017 | Pycko et al. |
| 10,032,066 | B2 | 7/2018 | Gongaware et al. |
| 10,237,730 | B2 | 3/2019 | Benoit et al. |
| 10,326,798 | B2 | 6/2019 | Lambert |
| 10,402,826 | B2 | 9/2019 | Tew et al. |
| 10,530,571 | B2 | 1/2020 | Moon et al. |
| 10,540,521 | B2 | 1/2020 | Baracaldo Angel et al. |
| 10,728,384 | B1 | 7/2020 | Channakeshava et al. |
| 10,885,902 | B1 | 1/2021 | Papania-Davis et al. |
| 11,024,295 | B2 | 6/2021 | Schmidt et al. |
| 11,039,013 | B1 | 6/2021 | Garrod et al. |
| 11,138,334 | B1 | 10/2021 | Garrod et al. |
| 11,210,461 | B2 * | 12/2021 | Thomson ............... G10L 15/22 |
| 11,217,223 | B2 | 1/2022 | Gkoulalas-Divanis et al. |
| 11,482,220 | B1 | 10/2022 | Kosowski et al. |
| 2003/0105634 | A1 | 6/2003 | Abella et al. |
| 2005/0005145 | A1 | 1/2005 | Teixeira |
| 2010/0082342 | A1 | 4/2010 | Erhart et al. |
| 2012/0027195 | A1 | 2/2012 | Shaffer et al. |
| 2015/0215112 | A1 | 7/2015 | Moon |
| 2018/0091487 | A1 | 3/2018 | Lin et al. |
| 2018/0137295 | A1 | 5/2018 | Sharma |
| 2019/0057698 | A1 * | 2/2019 | Raanani ............... H04M 3/2281 |
| 2019/0158889 | A1 * | 5/2019 | Xue ................... H04N 21/8547 |
| 2020/0196141 | A1 | 6/2020 | Baker et al. |
| 2020/0314133 | A1 | 10/2020 | Singh et al. |
| 2021/0389924 | A1 * | 12/2021 | Chong ................. H04W 12/02 |
| 2022/0019671 | A1 | 1/2022 | Boone et al. |
| 2022/0084501 | A1 | 3/2022 | Ananthapur Bache et al. |
| 2022/0092583 | A1 * | 3/2022 | Ur ...................... H04M 3/2281 |
| 2022/0114274 | A1 * | 4/2022 | Fathalla ............. G06F 21/6218 |
| 2022/0199073 | A1 | 6/2022 | Ramadas et al. |
| 2022/0199093 | A1 | 6/2022 | Ramadas et al. |
| 2022/0270599 | A1 * | 8/2022 | Nitzberg ................ G10L 15/22 |
| 2022/0303502 | A1 * | 9/2022 | Fisher ................... H04R 3/005 |

FOREIGN PATENT DOCUMENTS

| | | |
|---|---|---|
| GB | 2578121 A | 4/2020 |
| WO | 2012170128 A1 | 12/2012 |
| WO | 2019110574 A1 | 6/2019 |

OTHER PUBLICATIONS

Cohn et al., "Audio De-identification: A New Entity Recognition Task," ArXiv.org, arXiv: 1903.07037, May 5, 2019, 8 pp.

Day et al., "Amazon Workers Are Listening to What You Tell Alexa," Bloomberg Technology, Retrieved Apr. 22, 2021 from: https://web.archive.org/web/20200725032141/https://www.bloomberg.com/news/articles/2019-04-10/is-anyone-listening-to-you-on-alexa-a-global-team-reviews-audio, Apr. 10, 2019, 7 pp.

Day et al., "Amazon's Alexa Team Can Access Users' Home Addresses," Bloomberg Technology, Retrieved Apr. 22, 2021 from: https://web.archive.org/web/20200725032323/https://www.bloomberg.com/news/articles/2019-04-24/amazon-s-alexa-reviewers-can-access-customers-home-addresses, Apr. 24, 2019, 4 pp.

Gandhi et al., "A Study on Current Scenario of Audio Encryption", International Journal of Computer Applications, vol. 116, No. 7, Apr. 2015, pp. 13-17.

Jia et al., "Direct speech-to-speech translation with a sequence-to-sequence model," ArXiv.org, arXiv: 1904.06037, Jun. 25, 2019, 5 pp.

Kemler, "If it has audio, now it can have captions," Google, Retrieved Apr. 19, 2021 from: https://www.blog.google/products/android/live-caption/, Oct. 16, 2019, 4 pp.

Krasnowski et al., "Introducing a Verified Authenticated Key Exchange Protocol over Voice Channels for Secure Voice Communication", ICISSP, 2020, pp. 683-690, (Applicant points out, in accordance with MPEP 609.04(a), that the year of publication, 2020, is sufficiently earlier than the effective U.S. filing date, so that the particular month of publication is not in issue.).

McCoy, "Target to pay $18.5M for 2013 data breach that affected 41 million consumers," USA Today, Retrieved Apr. 22, 2021 from: https://web.archive.org/web/20200813213810if_/https://www.usatoday.com/story/money/2017/05/23/target-pay-185m-2013-data-breach-affected-consumers/102063932/, May 23, 2017, 2 pp.

Perez, "Amazon Alexa launches its first HIPAA-compliant medical skills," Verizon Media; TechCrunch, Retrieved Aug. 31, 2020 from: https://techcrunch.com/2019/04/04/amazon-alexa-launches-its-first-hipaa-compliant-medical-skills/, Apr. 4, 2019, 12 pp.

Siriteam, "Hey Siri: An On-device DNN-powered Voice Trigger for Apple's Personal Assistant," Apple, Inc., Retrieved Apr. 19, 2021 from: https://machinelearning.apple.com/research/hey-siri, Oct. 2017, 11 pp.

Vincent, "Inaudible ultrasound commands can be used to secretly control Siri, Alexa, and Google Now", TheVerge, Retrieved Apr. 13, 2021 from: https://www.theverge.com/2017/9/7/16265906/ultrasound-hack-siri-alexa-google, Sep. 7, 2017, 4 pp.

Office Action from U.S. Appl. No. 17/133,311, dated Mar. 15, 2023, 49 pp.

Prosecution History from U.S. Appl. No. 17/133,311, dated Jun. 22, 2022 through Jan. 23, 2023, 111 pp.

Response to Office Action dated Mar. 15, 2023 from U.S. Appl. No. 17/133,311, filed Jun. 15, 2023, 11 pp.

Notice of Allowance from U.S. Appl. No. 17/133,311, dated Aug. 9, 2023, 12 pp.

* cited by examiner

ROUTING OF SENSITIVE-INFORMATION UTTERANCES THROUGH SECURE CHANNELS IN INTERACTIVE VOICE SESSIONS

BACKGROUND

As voice recognition technology has matured, it has become easier for individuals to interact with organizations through interactive voice systems, such as voice assistant systems. Examples of voice assistant systems include ALEXA™ from Amazon.com, Inc., SIRI™ from Apple Inc., Google Assistant from Alphabet Inc., CORTANA™ from Microsoft Corporation, and so on. Such interactive voice systems may serve as channels through which an organization can receive information from a user. For example, a healthcare provider may receive information from a user indicating that the user wants to schedule an appointment. An interactive voice session is a session with an interactive voice system. Environments such as hospitals, office spaces, etc. are increasingly deploying voice assistant system and smart speakers to enable their workforces to make use of alternate input methods such as speech etc.

While these voice assistant systems and smart speakers may help improve productivity and overall experience, they may also pose certain risks in terms of exposing personal health information (PHI) and personally identifying information (PII). For instance, during an interactive voice session, the user may provide sensitive information. For example, the user may provide their Social Security number (SSN), personally identifiable information, information about health conditions, bank account numbers, home address, telephone number, or other types of sensitive information. Sensitive information of this type may be the target for malicious actors. For instance, malicious actors may use sensitive information of this type for purposes of identity theft, extortion, doxing, social engineering, and other malign activities.

SUMMARY

The present disclosure describes devices, systems, and methods for protecting sensitive information in spoken content during interactive voice sessions. As described herein, a computing system may predict an occurrence and duration of a sensitive-information utterance during an interactive voice session with an interactive voice system that interacts with a server to obtain content to provide to the user during the interactive voice session. The sensitive-information utterance is a spoken utterance of a user in which the user utters potentially sensitive information. The computing system may de-identify the sensitive-information utterance or otherwise prevent transmission of the sensitive-information utterance during the interactive voice session.

For instance, the computing system may mask the sensitive-information utterance so that sensitive information in the sensitive-information utterance is obfuscated. In some examples, the computing system may obfuscate the sensitive-information utterance by replacing the sensitive-information utterance with alternative audio data based on a voice of the user. In some examples, obfuscating the sensitive-information utterance may prevent a party receiving other information through the interactive voice session from obtaining the sensitive information utterance. In some examples, obfuscating the sensitive information may prevent the sensitive-information utterance from being obtained by a third-party interactive voice system that facilitates the interactive voice session. Obfuscating the sensitive information utterance may also prevent third parties from intercepting the sensitive-information utterance. Furthermore, in accordance with one or more techniques of this disclosure, the computing system may transmit the sensitive-information utterance to the server via a secure communication channel. In this way, the server may be able to use the sensitive-information utterance in the course of generating content for the interactive voice session. Thus, in some examples, the techniques of this disclosure may provide cybersecurity enhancements for computing systems.

In one example, this disclosure describes a method comprising obtaining, by a computing system, first audio data representing one or more initial utterances during an interactive voice session with an interactive voice system that interacts with a server to obtain content to provide to a user during the interactive voice session; generating, by the computing system, based on the first audio data, a prediction regarding whether a subsequent utterance of the user in the interactive voice session will contain sensitive information, wherein the subsequent utterance follows the one or more initial utterances in time; transmitting, by the computing system, the first audio data to the interactive voice system via a first communication channel; obtaining, by the computing system, second audio data representing the subsequent utterance; determining, by the computing system, based on the prediction, whether to transmit the second audio data to the interactive voice system via a first communication channel; and based on a determination not to transmit the second audio data to the interactive voice system via the first communication channel: transmitting, by the computing system, third audio data to the interactive voice system via the first communication channel in place of the second audio data; and transmitting, by the computing system, the second audio data to the server via a second communication channel that bypasses the interactive voice system.

In another example, this disclosure describes a system comprising: a first computing system comprising one or more first processors implemented in first circuitry, the one or more first processors configured to implement a guardian system; and a second computing system comprising one or more second processors implemented in second circuitry, wherein the one or more second processors provide a server; wherein the guardian system is configured to: obtain first audio data representing one or more initial utterances during an interactive voice session with an interactive voice system and that interacts with the server to obtain content to provide to a user during the interactive voice session; generate, based on the first audio data, a prediction regarding whether a subsequent utterance of the user in the interactive voice session will contain sensitive information, wherein the subsequent utterance follows the one or more initial utterances in time; obtain second audio data representing the subsequent utterance; determine, based on the prediction, whether to transmit the second audio data to the interactive voice system via a first communication channel; and based on a determination not to transmit the second audio data to the interactive voice system via the first communication channel: transmit third audio data to the interactive voice system via the first communication channel in place of the second audio data; and transmit, the second audio data to the server via a second communication channel that bypasses the interactive voice system.

In another example, this disclosure describes a computer-readable storage medium comprising instructions that, when executed, cause processing circuitry of a computing system to: obtain first audio data representing one or more initial utterances during an interactive voice session with an interactive voice system that interacts with a server to obtain content to provide to a user during the interactive voice session; generate, based on the first audio data, a prediction regarding whether a subsequent utterance of the user in the interactive voice session will contain sensitive information, wherein the subsequent utterance follows the one or more initial utterances in time; obtain second audio data representing the subsequent utterance; determine, based on the prediction, whether to transmit the second audio data to the interactive voice system via a first communication channel; and based on a determination not to transmit the second audio data to the interactive voice system via the first communication channel: transmit third audio data to the interactive voice system via the first communication channel in place of the second audio data; and transmit the second audio data to the server via a second communication channel that bypasses the interactive voice system.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
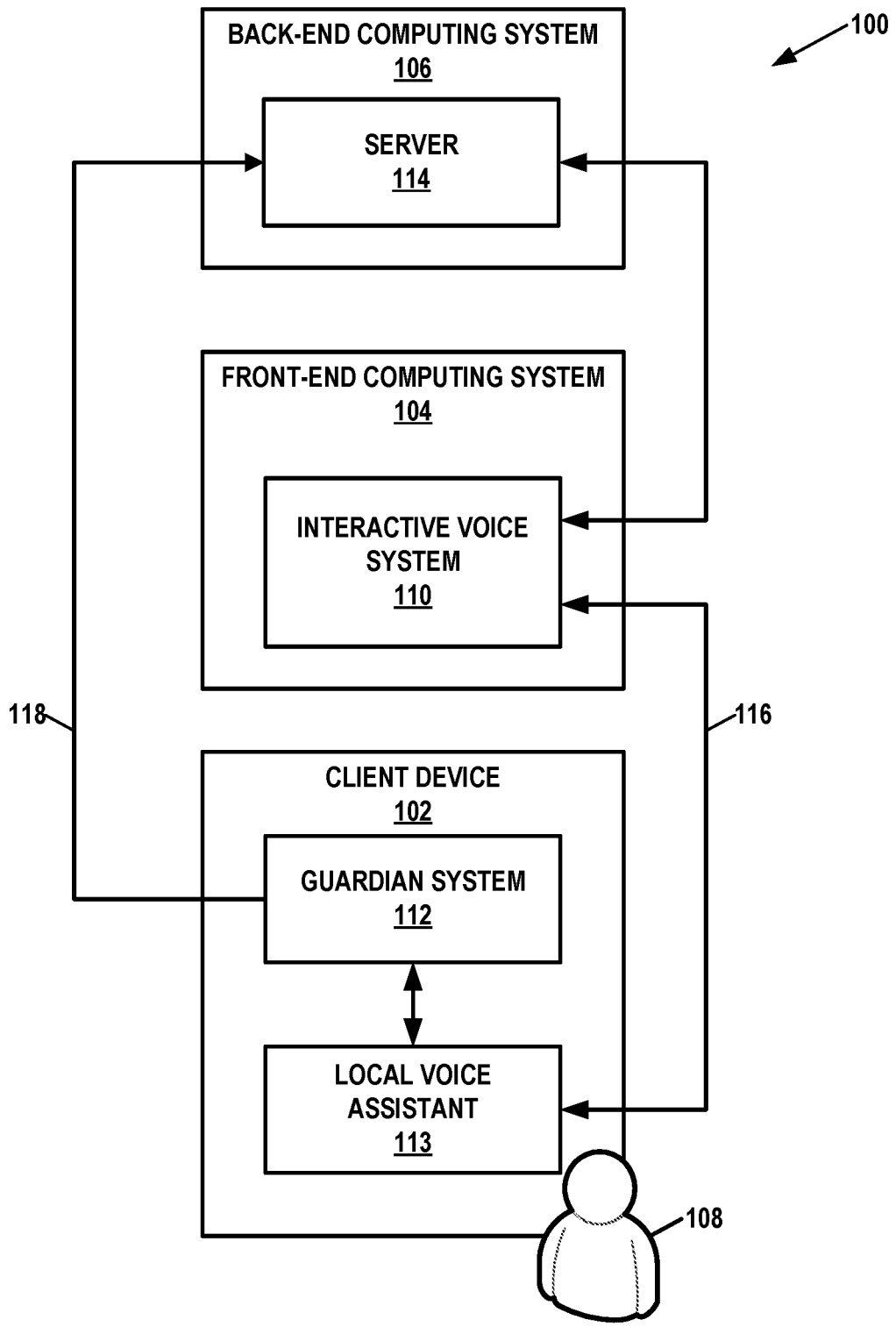
FIG. 1 is a block diagram illustrating an example system in accordance with one or more techniques of this disclosure.

FIG. 1 is a block diagram illustrating an example system 100 in accordance with one or more techniques of this disclosure. In the example of FIG. 1, system 100 includes a client device 102, a front-end computing system 104, and a back-end computing system 106. In other examples, system 100 may include more, fewer, or different components.

Front-end computing system 104 and back-end computing system 106 may each include one or more computing devices. In examples where a computing system, such as either front-end computing system 104 or back-end computing system 106, includes two or more computing devices, the computing devices of the computing system may act together as a system. Example types of computing devices may include server devices, personal computers, handheld computers, intermediate network devices, data storage devices, and so on. In examples where a computing system, such as front-end computing system 104 or back-end computing system 106, includes two or more computing devices, the computing devices of the computing system may be geographically distributed or concentrated together (e.g., in a single data center). Different organizations may operate different computing devices within front-end computing system 104 and back-end computing system 106. Moreover, different organizations may operate front-end computing system 104 and back-end computing system 106.

Client device 102 may be a computing system that comprises one or more computing devices. Client device 102 is configured to generate audio data representing sounds generated by a user 108. Client device 102 may also be configured to generate sound based on audio data generated by interactive voice system (IVS) 110, described below, or another source. Client device 102 may also include one or more devices. For example, client device 102 may include a smart speaker device, a personal computer, a mobile phone, a tablet computer, an ambient computing device, an Internet of Things (IoT) device, or another type of device. Client device 102 may be configured to communicate with front-end computing system 104 and back-end computing system 106 via one or more communication networks, such as the Internet. In some examples, client device 102 is included in the one or more computing devices of front-end computing system 104.

In the example of FIG. 1, client device 102 is configured to implement a guardian system 112 and a local voice assistant 113. Front-end computing system 104 is configured to implement IVS 110. Back-end computing system 106 is configured to implement a server 114. IVS 110 may be configured to obtain audio data from local voice assistant 113 of client device 102, and process the audio data to determine semantic content of the audio data. In other words, IVS 110 may determine what speech sounds represented by the audio data mean. For instance, IVS 110 may determine words represented by the audio data. Additionally, IVS 110 may send response audio data to local voice assistant 113 of client device 102. The response audio data may represent sound that may, e.g., be responsive to the semantic content of the audio data obtained from local voice assistant 113.

In some examples, IVS 110 may be or may include a voice assistant system, such as ALEXA by Amazon.com Inc., SIRI by Apple Inc., CORTANA by Microsoft Corp., or another type of voice assistant system. In some examples, IVS 110 may be implemented at least in part as an application on client device 102. In some examples, IVS 110 is implemented as part of a web application. In some examples, IVS 110 may include a voice user interface system. Although depicted in the example of FIG. 1 as being part of front-end computing system 104, some or all of the functionality of IVS 110 may be implemented in client device 102 or another device. For instance, some of the functionality of IVS 110 may be implemented in client device 102 and some of the functionality of IVS 110 may be implemented in front-end computing system 104.

User 108 may engage in an interactive voice session with IVS 110. During an interactive voice session with IVS 110, user 108 may utter various types of statements to client device 102. Local voice assistant 113 may generate audio data based on speech sounds of user 108. Example types of statements may include requests, responses to questions, formalities, commands, and so on. For example, user 108 may utter a spoken request to client device 102 to request a visit to a healthcare provider. In another example, user 108 may utter a spoken request to client device 102 to access financial information. Local voice assistant 113 may configure client device 102 to transmit the audio data to IVS 110. Local voice assistant 113 of client device 102 may obtain response audio data from IVS 110 and cause client device 102 to output sound, such as utterances, based on the response audio data. For instance, user 108 may say "I'd like to schedule an appointment with a dermatologist" and local voice assistant 113 may cause client device 102 to say "I can help you with that" based on response audio data generated by IVS 110. In some examples where client device 102 includes a display screen, local voice assistant 113 may receive data from IVS 110 and may cause the display device of client device 102 to display text based on the audio data.

In some examples, IVS 110 provides semantic data to server 114. For example, if the audio data obtained by IVS 110 represents speech indicating a request to visit a physical therapist, IVS 110 may provide semantic data to server 114 indicating that user 108 wants to visit a physical therapist. In some examples, IVS 110 may provide some or all of the audio data to server 114. In some examples where IVS 110 provides some or all of the audio data to server 114, server 114 may determine semantic data of the utterances based on the audio data. In some examples, specific functionality of server 114 may be a "skill" of a voice assistant system.

Server 114 may process the semantic data in various ways. For example, server 114 may store the semantic data, use the semantic data in an Application Programming Interface (API) to perform specific functions, and so on. Furthermore, in some examples, based on the semantic data, server 114 may generate response data. In some examples, IVS 110 may use the response data to synthesize response audio data representing a spoken version of the response data. IVS 110 may provide the response audio data to client device 102. In some examples, the response data generated by server 114 includes audio data and IVS 110 may forward the audio data to client device 102. Local voice assistant 113 of client device 102 may cause client device 102 to output sound based on the received audio data.

In some examples, a "skill" installed on IVS 110 is configured to communicate with server 114. For example, a company XYZ provides medical self-help service. In this example, XYZ has deployed a skill that allows user 108 to access a "skill" installed on a voice assistant system. In this example, the following dialog may occur between user 108 and IVS 110:

User: Help me order some medicines for my headache
IVS: Which service would you like to use ABC-Rx or XYZ-Rx?
User: Let's order using XYZ-RX
IVS: Sure, what medicine would you like to order?
User: Aspirin
IVS: How about the quantity?
User: 2 strips please
IVS: Sure, anything else?
User: No, that's all
IVS: Ok, please wait while I process this order.
IVS: Your order is ready to place, how would you like to pay? Using your insurance, cash, credit-card?
User: Insurance
IVS: Sure, initiating payment
< At this point, the XYZ skill opens a session with server 114 as user 108 is insured through an insurance provider associated with server 114>
IVS: Please share your member-id and SSN
User: Member ID is 34567 and SSN is 123456789
< At this point, the XYZ skill receives the member identifier and social security number and sends the member identifier and social security number to server 114>
IVS: Thank you, your order has been placed.

In this example, if XYZ does not have a required compliance level to receive PHI/PII data, this dialog may violate privacy regulations. In this example, "ABC" and "XYZ" are imaginary names used as examples. The techniques of this disclosure may address this problem. For example, guardian system 112 may be configured to intercept sensitive-information utterances during interactive voice sessions prior to local voice assistant 113 causing client device 102 to transmit the sensitive-information utterances to IVS 110, or IVS 110 otherwise receiving the sensitive-information utterances. As part of intercepting sensitive-information utterances, guardian system 112 may predict that user 108 is about to speak a sensitive-information utterance and may predict a temporal duration of the sensitive-information utterance. For example, guardian system 112 may determine that user 108 has said, "my social security number is" or that client device 102 has output an utterance that said, "what is your social security number?". In this example, guardian system 112 may therefore determine that the next utterance of user 108 will be the social security number of user 108. Rather than allowing the sensitive-information utterance from being transmitted, guardian system 112 may obfuscate the intercepted sensitive-information utterances, thereby transmitting replacement utterances to IVS 110 instead of the sensitive-information utterances.

Guardian system 112 may be implemented in one of several ways with respect to IVS 110 and server 114. For instance, in the example of FIG. 1, guardian system 112 is implemented on client device 102. In other examples, guardian system 112 may be implemented, at least in part, by front-end computing system 104, and/or other computing devices.

In accordance with one or more techniques of this disclosure, when guardian system 112 obfuscates a sensitive-information utterance, guardian system 112 may replace the sensitive-information utterance with replacement audio data that is based on the voice of user 108, in some examples. In other words, the replacement audio data represents sound that sounds like the voice of user 108. The replacement audio data does not represent sound of sensitive information. For example, if the sensitive-information utterance is "321 Evergreen Street," the replacement audio data may represent the sound of "123 Fake Street." In some examples, guardian system 112 may generate the replacement audio data based on snippets of previously recorded sound of the voice of user 108. In some examples, guardian system 112 may extract vocal characteristics of the voice of user 108 and use the extracted vocal characteristics to synthesize the replacement audio data.

Replacing a sensitive-information utterance with replacement audio data that is based on the voice of user 108 may address several issues. For example, use of replacement audio data instead of an altered form of the original sensitive-information utterance may prevent an attacker from potentially recovering the sensitive-information utterance from the altered form of the sensitive-information utterance. In another example, IVS 110 may be configured to expect to receive audio data at the time of the sensitive-information utterance. If IVS 110 does not receive audio data, does not receive audio data containing speech sounds, or does not receive audio data containing speech sounds representing a particular type of data, IVS 110 might not be able to proceed to a next operation and/or may generate audio response data representing sounds to prompt user 108 to provide the information again. This may result in user 108 providing the sensitive information multiple times without IVS 110 being able to perform an expected operation, which may cause frustration and may make the sensitive information more likely to be improperly obtained. Using a replacement utterance in place of a sensitive-information utterance may help to avoid this problem, because IVS 110 may continue operation based on the replacement utterance.

Furthermore, use of replacement audio data that is based on the voice of user 108 may help with the operation of IVS 110. For instance, the audio data received by IVS 110 could contain the vocal sounds of multiple people, e.g., in the case where multiple people are in the same room as user 108. However, IVS 110 may need to distinguish between the vocal sounds of the multiple people to ensure that IVS 110 is acting upon audio data of the person involved in the interactive voice session with IVS 110. Accordingly, if the replacement audio data generated by guardian system 112 were not based on the voice of user 108, IVS 110 may assume that the replacement audio data represents the voice of another person, and may disregard the replacement audio data. Because IVS 110 may disregard the audio data in this scenario, IVS 110 may assume that user 108 has not provided a response and a similar problem to that described above may occur (e.g., user 108 needing to repeatedly provide the information). However, in examples where guardian system 112 generates the replacement audio data based on the voice of user 108, IVS 110 may determine that user 108 has provided information and may continue operation. In this way, use of the replacement audio data may avoid user frustration, avoid user 108 providing the sensitive information multiple times, and may prevent IVS 110 and/or server 114 from obtaining the sensitive information.

Hence, guardian system 112 may obtain first audio data representing one or more initial utterances during an interactive voice session with IVS 110. Guardian system 112 may generate, based on the first audio data, a prediction regarding whether a subsequent utterance of user 108 during the interactive voice session will contain sensitive information. The subsequent utterance follows the one or more initial utterances in time. Guardian system 112 may transmit the first audio data to IVS 110 via a communication channel 116. Guardian system 112 may subsequently obtain second audio data representing the subsequent utterance. Guardian system 112 may determine, based on the prediction, whether to transmit the second audio data. Based on a determination not to transmit the second audio data, guardian system 112 may replace the second audio data with third audio data and may transmit the third audio data to IVS 110. The third audio data may be based on a voice of user 108. For instance, guardian system 112 may transmit the first audio data and the third audio data to IVS 110 and not transmit the second audio data to IVS 110.

In accordance with one or more techniques of this disclosure, guardian system 112 may transmit the second audio data (i.e., audio data predicted to include a sensitive-information utterance) to server 114 via a secure communication channel 118 that bypasses IVS 110. Secure communication channel 118 may be encrypted. Moreover, security is imparted to secure communication channel 118 because information passed through secure communication channel 118 bypasses IVS 110. In this way, server 114 may obtain the second audio data but IVS 110 does not obtain the second audio data. When server 114 obtains the third audio data (or semantic content of the third audio data), server 114 may determine that the third audio data corresponds to the second audio data. Server 114 may then generate content (e.g., response data) based on semantic content of the second audio data. Server 114 may then provide the response data to IVS 110 in response to the third audio data (or semantic content of the third audio data). IVS 110 may convert the response data into audio data and send the audio data to local voice assistant 113 of client device 102. For example, the second audio data may indicate the real home address of user 108 and the third audio data may indicate a fake home address of user 108. In this example, when server 114 receives the semantic content of the third audio data (e.g., data indicating the fake home address), server 114 may determine that the fake home address corresponds to the real home address represented by the second audio data. Furthermore, in this example, server 114 may then generate content based on the real home address, such as a message thanking user 108 for providing their home address. Server 114 may also perform other actions based on the semantic content of the second audio data. For instance, in the previous example, server 114 may look up the closest hospital to the home address of user 108 and generate content indicating the location of the closest hospital to the home address of user 108.

In some examples, guardian system 112 is configured to determine whether to transmit sensitive-information utterances via IVS 110. In other words, there may be circumstances in which it is acceptable to transmit sensitive-information utterances to IVS 110 and other circumstances in which it is not acceptable to transmit sensitive-information utterances to IVS 110 or another IVS. As described in greater detail elsewhere in this disclosure, guardian system 112 may determine whether to transmit the sensitive-information utterances to IVS 110 based on a risk profile of IVS 110. For example, different users may use different IVS's. For instance, a first user may use the SIRI™ voice assistant system from Apple Inc., a second user may use ALEXA™ from Amazon.com Inc., a third user may use a special-purpose application that includes a voice interface, a fourth user may use an interactive voice system in a web application, and so on.

To accommodate a wide range of users, server 114 may be able to act on data received via multiple interactive voice systems. However, different interactive voice systems may have different levels of security. For example, a first IVS may be configured to process voice data locally on client device 102 and only transmit encrypted data (e.g., encrypted semantic data) to server 114. However, a second IVS may be configured to process voice data at a location separate from client device 102. In this example, the second IVS may or may not provide adequate measures to prevent disclosure of sensitive information, such as audio data of sensitive-information utterances or semantic content of sensitive-information utterances. Thus, in this example, it may be acceptable for sensitive information to be transmitted via the first IVS but not the second IVS. Moreover, the same IVS may treat different classes of sensitive information differently. Thus, it might be safe to transmit one class of sensitive information on an IVS but not safe to transmit another class of sensitive information on the same IVS.

Hence, in accordance with one or more techniques of this disclosure, guardian system 112 may obtain first audio data representing one or more initial utterances (e.g., of user 108, rendered by client device 102, etc.) during an interactive voice session with IVS 110. Additionally, guardian system 112 may generate, based on the first audio data, a prediction regarding whether a subsequent utterance of user 108 in the interactive voice session will contain sensitive information. The subsequent utterance follows the one or more initial utterances in time. Guardian system 112 may also obtain second audio data representing the subsequent utterance. Guardian system 112 may determine, based on the prediction and based on a risk profile of IVS 110, whether to transmit the second audio data to IVS 110. Based on the determination to transmit the second audio data to IVS 110, guardian system 112 may transmit the second audio data to IVS 110. Otherwise, guardian system 112 does not transmit the second audio data to IVS 110. In some examples, rather than not transmitting the second audio data, guardian system 112 may transmit replacement audio data to IVS 110 or no audio data to IVS 110.

Although many examples of this disclosure are described with respect to audio data, some examples of this disclosure may use text data instead of audio data. Thus, in such examples, guardian system 112 may obtain first text data (e.g., text data generated by user 108, text data output by client device 102, etc.), generate, based on the first text data, a prediction regarding whether a subsequent text utterance of user 108 during an interactive text session will contain sensitive information. In this example, guardian system 112 may obtain second text data representing the subsequent text utterance and determine, based on the prediction, whether to transmit the second text data. In this example, based on a determination not to transmit the second text data, guardian system 112 may replace the second text data with third text data and transmit the third text data. In some examples, guardian system 112 may determine, based on the prediction and based on a risk profile of the interactive text system, whether to transmit the second text data to the interactive text system. In accordance with a technique of this disclosure, guardian system 112 may transmit the second text data to server 114.

Figure 2:
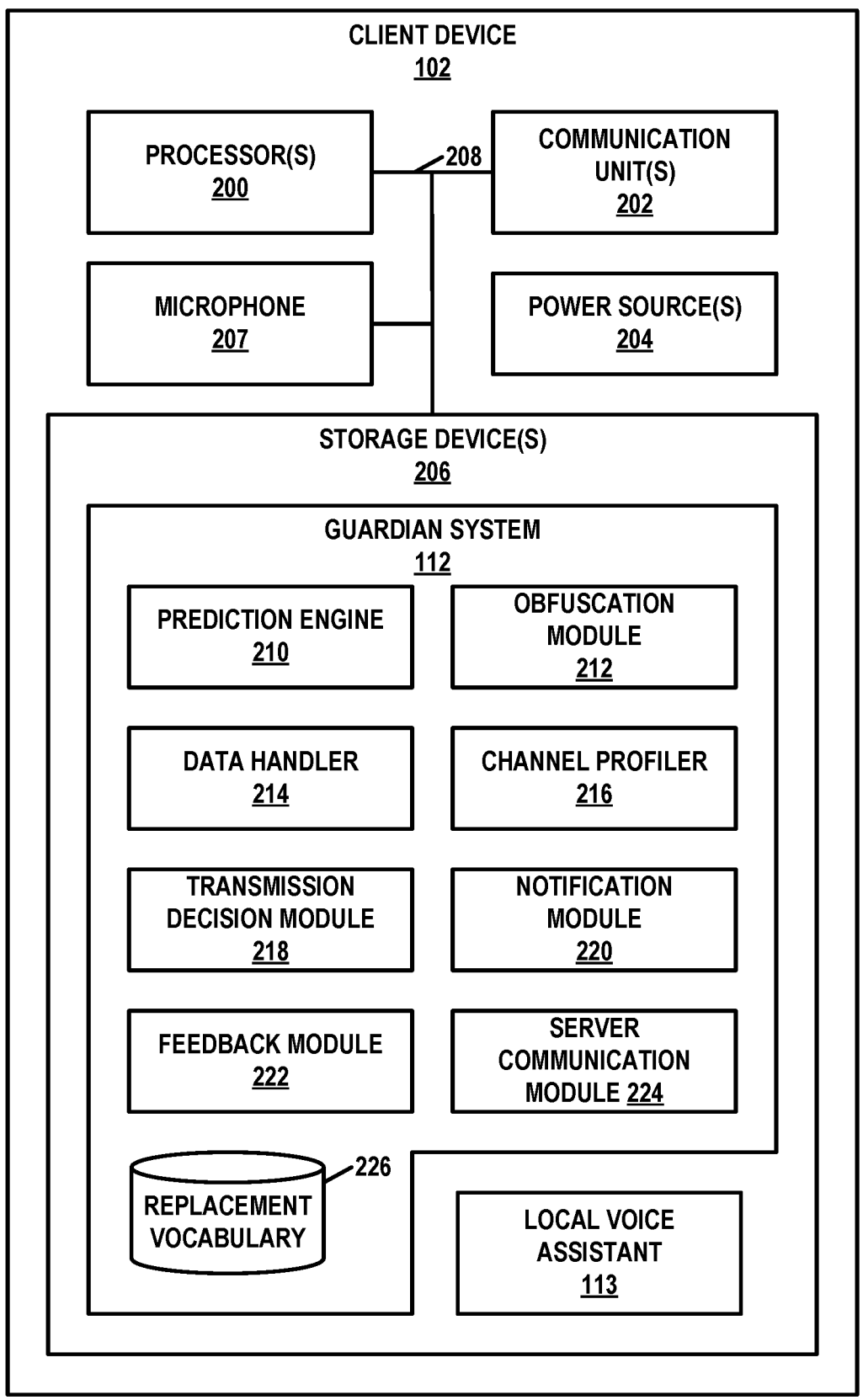
FIG. 2 is a block diagram illustrating an example client device in accordance with one or more techniques of this disclosure.

FIG. 2 is a block diagram illustrating example components of client device 102 in accordance with one or more techniques of this disclosure. FIG. 2 illustrates only one example of client device 102, without limitation on any other example configurations of client device 102.

As shown in the example of FIG. 2, client device 102 includes one or more processors 200, one or more communication units 202, one or more power sources 204, one or more storage devices 206, a microphone 207, and one or more communication channels 208. Client device 102 may include other components. For example, client device 102 may include input devices, output devices, display screens, and so on. Communication channel(s) 208 may interconnect each of components 200, 202, 206, 207 for inter-component communications (physically, communicatively, and/or operatively). In some examples, communication channel(s) 208 may include a system bus, a network connection, an inter-process communication data structure, or any other technique for communicating data. Power source(s) 204 may provide electrical energy to components 200, 202, 206, and 207. Storage device(s) 206 may store information required for use during operation of client device 102.

Processor(s) 200 comprise circuitry configured to perform processing functions. For instance, one or more of processor(s) 200 may be a microprocessor, an application-specific integrated circuit (ASIC), a field-programmable gate array (FPGA), or another type of processing circuitry. In some examples, processor(s) 200 of client device 102 may read and may execute instructions stored by storage device(s) 206. Processor(s) 200 may include fixed-function processors and/or programmable processors. Processor(s) 200 may be included in a single device or distributed among multiple devices.

Communication unit(s) 202 may enable client device 102 to send data to and receive data from one or more other computing devices (e.g., via a communications network, such as a local area network or the Internet). In some examples, communication unit(s) 202 may include wireless transmitters and receivers that enable client device 102 to communicate wirelessly with other computing devices. Examples of communication unit(s) 202 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Client device 102 may use communication unit(s) 202 to communicate with one or more other computing devices or systems, such as client device 102. Communication unit(s) 202 may be included in a single device or distributed among multiple devices.

Processor(s) 200 may read instructions from storage device(s) 206 and may execute instructions stored by storage device(s) 206. Execution of the instructions by processor(s) 200 may configure or cause client device 102 to provide at least some of the functionality ascribed in this disclosure to client device 102. Execution of instructions associated with particular units, modules, systems, etc., by processor(s) 200 or other processors of this disclosure may cause devices or computing systems (e.g., computing device 102, front-end computing system 104, back-end computing system 106, etc.) to provide at least some of the functionality ascribed in this disclosure to such units, modules, systems, etc. Storage device(s) 206 may be included in a single device or distributed among multiple devices.

As shown in the example of FIG. 2, storage device(s) 206 may include computer-readable instructions associated with guardian system 112 and computer-readable instructions associated with local voice assistant 113. Furthermore, in the example of FIG. 2, the computer-readable instructions associated with guardian system 112 may include computer-readable instructions associated with a prediction engine 210, an obfuscation module 212, a data handler 214, a channel profiler 216, a transmission decision module 218, a notification module 220, a feedback module 222, and a server communication module 224. Guardian system 112 may also include a replacement vocabulary 226. In other examples, guardian system 112 may include more, fewer, or different components. For instance, in some examples, guardian system 112 does not include channel profiler 216, transmission decision module 218, notification module 220, and/or feedback module 222.

In general, guardian system 112 may receive audio data from local voice assistant 113. In some examples, guardian system 112 may transmit audio data representing non-sensitive-information utterances back to local voice assistant 113 for forwarding to IVS 110, or guardian system 112 may directly transmit the audio data representing non-sensitive-information utterances to IVS 110. For ease of explanation, this disclosure primarily describes guardian system 112 as transmitting the audio data to IVS 110. However, such descriptions may be adapted to guardian system 112 sending the audio data back to local voice assistant 113 for forwarding to IVS 110.

Prediction engine 210 of guardian system 112 may take utterances as input, may process the utterances in real-time to predict whether a next utterance contains sensitive information, and if so, may predict a duration of the sensitive-information utterance. Such utterances may be in the form of audio data. Obfuscation module 212 may obfuscate sensitive-information utterances. As described in detail elsewhere in this disclosure, obfuscation module 212 may obfuscate sensitive-information utterances in one or more of various ways. For instance, obfuscation module 212 may replace audio data representing sensitive-information utterances with audio data representing a replacement utterance. The replacement utterance may include (or may be limited to) words in replacement vocabulary 226. As described in greater detail elsewhere in this disclosure, replacement vocabulary 226 may be include a timed volatile random subset (t-VRS) containing replacement words. The replacement words may include natural language words, numbers, phrases, and the like.

Data handler 214 handles outputs of prediction engine 210 and obfuscation module 212 to prepare an appropriate data buffer queued for further transmission. Channel profiler 216 may determine risk profiles of channels (e.g., interactive voice systems) for one or more types of sensitive information. The risk profile of a channel may indicate a level of trust in the channel, level of risk associated with transmitting data on the channel, or other information. Transmission decision module 218 may make determinations (e.g., real-time decisions) regarding whether to transmit an utterance over a communication channel. Transmission decision module 218 may make the determinations based on data from channel profiler 216. In response to a determination that an utterance is not safe to transmit on a channel, notification module 220 may generate a notification to user 108. Feedback module 222 may provide feedback to prediction engine 210. Prediction engine 210 may use the feedback generated by feedback module 222 to improve the prediction of occurrences and/or temporal durations of sensitive-information utterances. Server communication module 224 may handle communication with server 114 that bypasses IVS 110.

In some examples, storage device(s) 206 may be configured to at least temporarily store audio data. For instance, storage device(s) 206 may be configured to store audio data representing one or more initial utterances (e.g., initial utterances of user 108) during an interactive voice session with IVS 110, audio data representing subsequent utterances, and so on.

Figure 3:
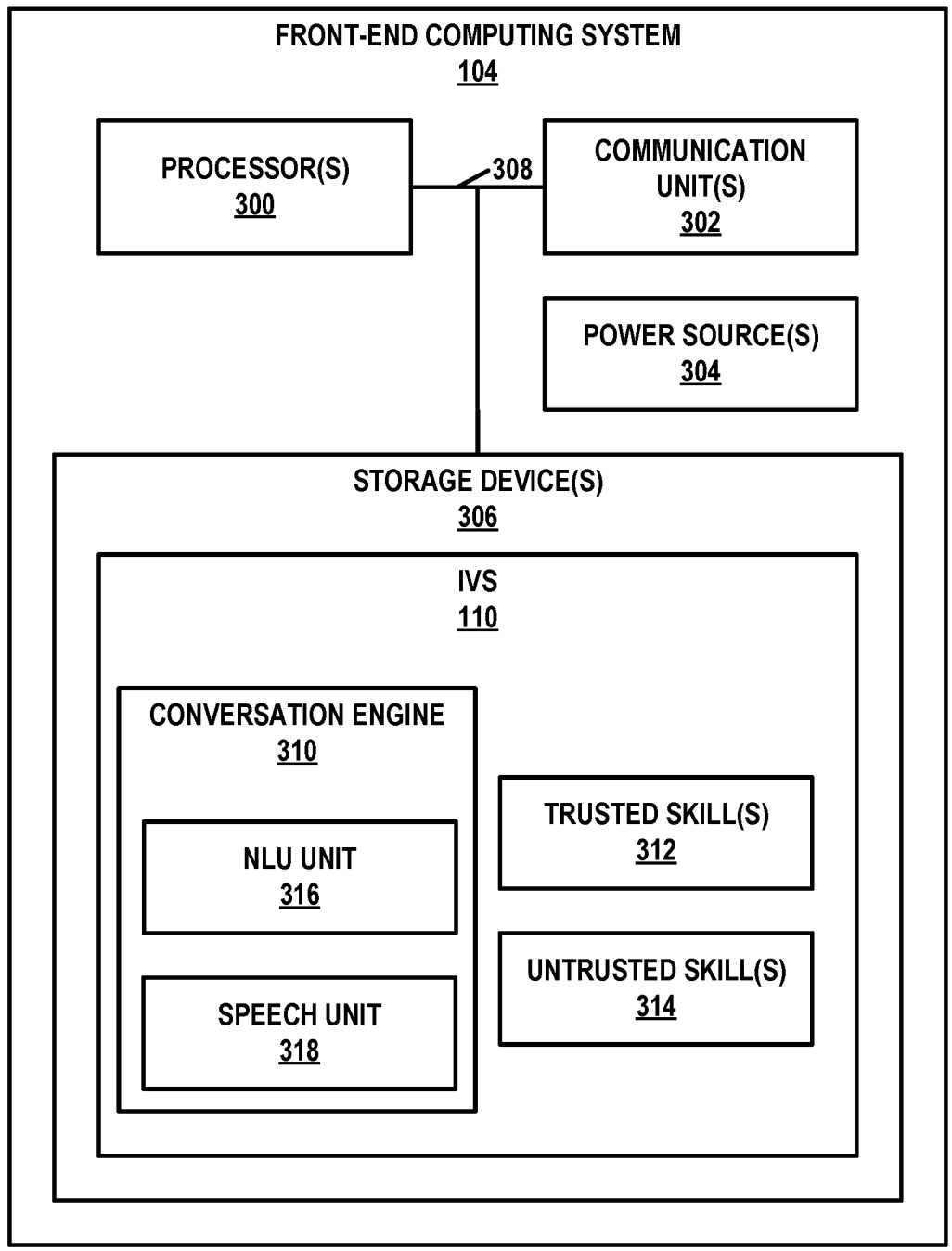
FIG. 3 is a block diagram illustrating an example front-end computing system in accordance with one or more techniques of this disclosure.

FIG. 3 is a block diagram illustrating example components of front-end computing system 104, in accordance with one or more techniques of this disclosure. FIG. 3 illustrates only one example of front-end computing system 104, without limitation on many other example configurations of front-end computing system 104. As shown in the example of FIG. 3, front-end computing system 104 may include one or more processors 300, one or more communication units 302, one or more power sources 304, one or more storage devices 306, and one or more communication channels 308. Front-end computing system 104 may include other components. For example, front-end computing system 104 may include input devices, output devices, display screens, and so on. Processor(s) 300, communication unit(s) 302, power source(s) 304, storage device(s) 306, and communication channel(s) 308 may be implemented in the same or similar ways as processor(s) 200, communication unit(s) 202, power source(s) 204, storage device(s) 206, and communication channel(s) 208 of FIG. 2. Execution of the instructions by processor(s) 300 may configure or cause front-end computing system 104 to provide at least some of the functionality ascribed in this disclosure to front-end computing system 104. Storage device(s) 306 may be included in a single device or distributed among multiple devices.

In the example of FIG. 3, storage device(s) 306 may include computer-readable instructions associated with IVS 110. Furthermore, in the example of FIG. 3, the computer-readable instructions associated with IVS 110 may include computer-readable instructions associated with a conversation engine 310, one or more trusted skills 312, and one or more untrusted skills 314. Conversation engine 310 may include a natural language understanding (NLU) unit 316 and a speech unit 318.

Conversation unit 310 may be configured to receive audio data from local voice assistant 113 of client device 102. NLU 316 of conversation unit 310 may apply natural language processing to the audio data to obtain semantic content of the audio data. Conversation unit 310 may use one or more of trusted skills 312 and untrusted skills 314 to generate a response to the semantic content of the audio data. Based on the response, speech unit 318 may synthesize audio data representing the response. Conversation unit 310 may then send the synthesized audio data to local voice assistant 113 of client device 102.

Trusted skills 312 may be skills that are trusted by an entity associated with server 114, such as a health insurance provider, healthcare provider, or other type of organization or entity. Untrusted skills 314 may include skills that are not trusted by the entity associated with server 114. In accordance with one or more techniques of this disclosure, trusted skills 312 may communicate with server 114. In some examples, one or more of trusted skills 312 may be server 114. Thus, in such examples, server 114 is not provided by a separate back-end computing system 106 but is provided by front-end computing system 104.

In general, "skills" may be software applications configured to provide content to conversation engine 310 in response to semantic content provided by conversation unit 310. In some examples, user 108 may instruct IVS 110 to use one of trusted skills 312 or untrusted skills 314 by speaking a voice command to local voice assistant 113. In other words, user 108 may instruct local voice assistant 113 to activate a skill. For example, user 108 may say "IVS, open the XYZ skill." In other examples, skills may be activated in other ways. In some examples, when a skill, such as one of trusted skills 312, is activated, the skill may cause IVS 110 to send an instruction to local voice assistant 113 to activate guardian system 112. Thus, while the skill is activated, guardian system 112 may ensure that sensitive-information utterances are not shared with IVS 110.

For example, the following dialog may occur when one of trusted skills 312 is activated:
User: Activate healthcare insurance skill.
IVS: Okay, let me help you with that.

IVS: To assist you please provide your member id and data of birth for authentication.

User: Let me grab my member id. It is 123456789 and the DOB is 12 Jul. 1960

IVS: Thank you for confirming. Hello John. How may I help you today?

User: What is my coverage for chiropractic?

Alexa: For chiropractic services, your plan covers acupuncture services for chronic low back pain only. There is a co-pay of 10%. As per my latest knowledge your out-of-pocket spending is $100.

User: Okay. Thanks.

Alexa: Is there anything I can help you with further?

User: No. Thank you.

Alexa: Thank you for reaching out. Have a great day ahead. (Session with Trusted app terminated)

In this example dialog, the command "activate healthcare insurance skill" may activate the trusted skill. Additionally, guardian system 112 may intercept the sensitive-information utterances of the member identifier and date of birth, and may send audio data representing the sensitive-information utterances to server 114, bypassing IVS 110. Guardian system 112 may instead send audio data (i.e., replacement audio data) representing a replacement utterance to IVS 110. Conversation engine 310 may then send the replacement utterance to the trusted skill, which may send to the replacement utterance to server 114. In other examples where the trusted skill implements server 114, the trusted skill may process the replacement audio data and the audio data representing the sensitive-information utterance to generate content to provide to conversation engine 310. Furthermore, in the example dialog above, the content generated by server 114 includes the information about the chiropractic coverage of user 108 and the out-of-pocket spending of user 108.

Figure 4:
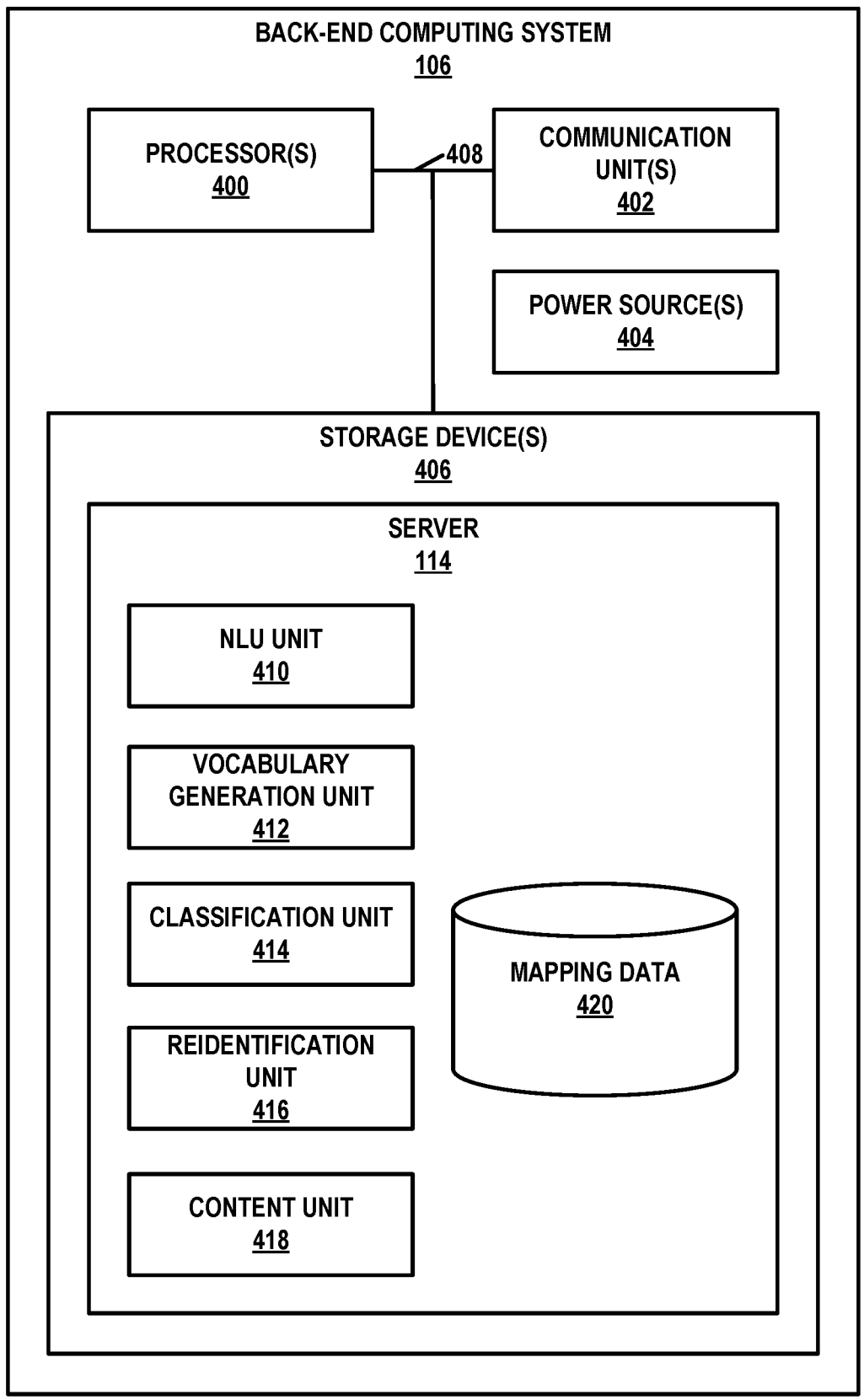
FIG. 4 is a block diagram illustrating an example back-end computing system in accordance with one or more techniques of this disclosure.

FIG. 4 is a block diagram illustrating example components of back-end computing system 106, in accordance with one or more techniques of this disclosure. FIG. 4 illustrates only one example of back-end computing system 106, without limitation on many other example configurations of back-end computing system 106. As shown in the example of FIG. 4, back-end computing system 106 may include one or more processors 400, one or more communication units 402, one or more power sources 404, one or more storage devices 406, and one or more communication channels 408. Back-end computing system 106 may include other components. For example, back-end computing system 106 may include input devices, output devices, display screens, and so on. Processor(s) 400, communication unit(s) 402, power source(s) 404, storage device(s) 406, and communication channel(s) 408 may be implemented in the same or similar ways as processor(s) 200, communication unit(s) 202, power source(s) 204, storage device(s) 206, and communication channel(s) 208 of FIG. 2. Execution of the instructions by processor(s) 400 may configure or cause back-end computing system 106 to provide at least some of the functionality ascribed in this disclosure to back-end computing system 106. Storage device(s) 406 may be included in a single device or distributed among multiple devices.

In the example of FIG. 4, storage device(s) 406 may include computer-readable instructions associated with server 114. Furthermore, in the example of FIG. 4, the computer-readable instructions associated with server 114 may include computer-readable instructions associated with a natural language understanding (NLU) unit 410, a vocabulary generation unit 412, a classification unit 414, a reidentification unit 416, and a content unit 418. Additionally, server 114 may include mapping data 420.

NLU 410 may apply natural language understanding to audio data to extract semantic content of the audio data. For example, NLU 410 may apply natural language understanding to audio data received from guardian system 112 to extract a sensitive-information utterance (and, in some examples, a replacement utterance). In some examples where server 114 receives audio data from IVS 110, NLU 410 may apply natural language understanding to the audio data received from IVS 110, e.g., to extract a replacement utterance.

Vocabulary generation unit 412 may generate t-VRS's from a global set of replacement values. Example classes of sensitive information may include dates, social security numbers, addresses, names, medical information, and/or other types of PHI or PII. The replacement values may be words, numbers, phrases, or the like. The t-VRS's may be specific to the current interactive voice session. Thus, different t-VRS's may be generated and used for different users.

Vocabulary generation unit 412 may transmit the t-VRS to guardian system 112, e.g., via secure communication channel 118. Vocabulary generation unit 412 may transmit refreshed t-VRS's to guardian system 112 at configured intervals or in response to various events. For instance, vocabulary generation unit 412 may use a timestamp of a t-VRS to determine whether it is time to refresh the t-VRS. Example timeout periods for a t-VRS may be 10 seconds, 60 seconds, etc. In some examples, a t-VRS may only be valid for the duration of an interactive voice session. In some examples, vocabulary generation unit 412 may transmit an updated t-VRS when the t-VRS is about to be exhausted. In some examples, vocabulary generation unit 412 may transmit an updated t-VRS when the number of data items in the t-VRS that have been used to replace words of sensitive-information utterances is above a particular threshold. In some examples, for low-latency processing, the t-VRS's may include only a limited number of words. Vocabulary generation unit 412 may generate the t-VRS's using either or both real-worlds and synthetic words. The use of t-VRS's that have limited lifespans may reduce the risk of an attacker determining a mapping between replacement utterances and sensitive-information utterances, thereby increasing cybersecurity.

Classification unit 414 may obtain a dataset for a sensitive-information utterance. For instance, classification unit 414 may receive the dataset from guardian system 112 via secure communication channel 118. The dataset may include audio data representing a replacement utterance, audio data representing a sensitive-information utterance, an identifier of a t-VRS, and/or other data. Classification unit 414 may store the dataset for the sensitive-information utterance in a sensitive information data store, e.g., mapping data 420.

Based on server 114 obtaining a replacement utterance from IVS 110 (e.g., directly receiving the semantic content of audio data representing the replacement utterance from IVS 110 or receiving the replacement utterance from NLU 410 based on audio data from IVS 110), reidentification unit 416 may use mapping data 420 to determine a sensitive-information utterance corresponding to the replacement utterance. Content unit 418 may then perform an action based on the sensitive-information utterance instead of the replacement utterance. For example, content unit 418 may generate content based on the sensitive-information utterance and cause communication unit(s) 302 to send the content to IVS 110.

Figure 5:
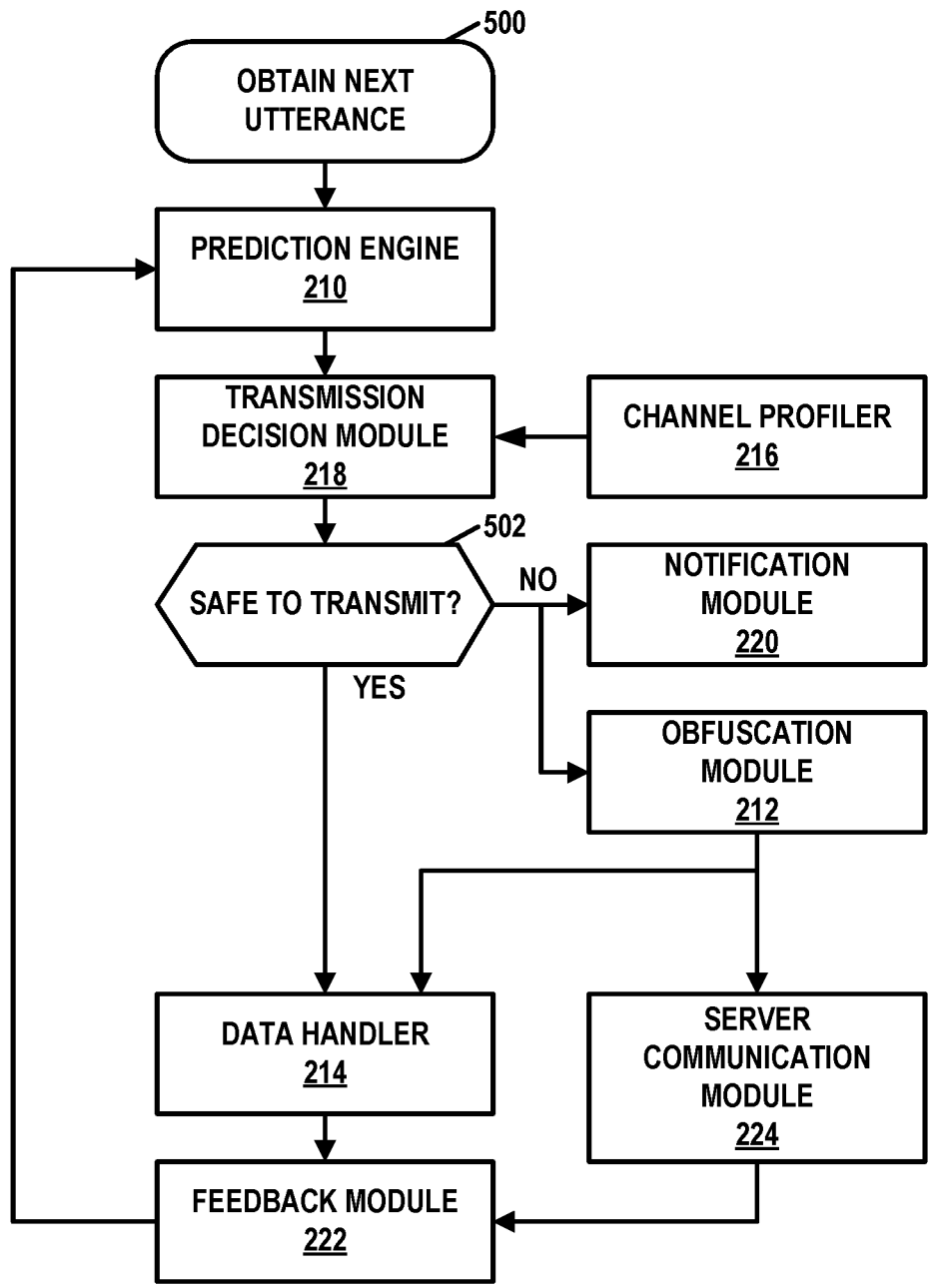
FIG. 5 is a flow diagram illustrating an example operation of a guardian system in accordance with one or more techniques of this disclosure.

FIG. 5 is a flow diagram illustrating an example operation of guardian system 112 in accordance with one or more techniques of this disclosure. The example of FIG. 5 is described with respect to the example of FIG. 2 but is not so limited.

In the example of FIG. 5, prediction engine 210 obtains an utterance (500). The utterance may correspond to sound within a first time window. Prediction engine 210 may determine whether a subsequent utterance (i.e., an utterance following the obtained utterance) is a sensitive-information utterance. The subsequent utterance may correspond to sound within a second time window that is advanced relative to the first time window (e.g., subsequent in time). In some examples, the first and second time windows are overlapping. In some examples, the first and second time windows are non-overlapping. If the subsequent utterance is a sensitive-information utterance, prediction engine 210 may determine an expected temporal duration of the sensitive-information utterance.

Additionally, in the example of FIG. 4, transmission decision module 218 may determine based on a risk profile for a current channel whether it is safe to transmit the sensitive-information utterance via the current channel (502). For example, channel profiler 216 may determine, based on the risk profile for the current channel, a risk score for the current channel for a class of the sensitive information. Transmission decision module 218 may use the risk score for the current channel for the class of the sensitive information to determine whether to transmit the sensitive-information utterance via the current channel. The current channel is a channel through which guardian system 112 is currently configured to send data during an interactive voice session, receive the utterance during the interactive session, or into which guardian system 112 is incorporated. The risk profile for a channel comprises data regarding risks of transmitting sensitive information via the channel.

Based on a determination that it is safe to transmit the sensitive-information utterance on the current channel or based on a determination that the utterance is not a sensitive-information utterance ("YES" branch of 502), data handler 214 may transmit the sensitive-information utterance or non-sensitive utterance via the current channel, e.g., to IVS 110 or server 114.

On the other hand, if transmission decision module 218 makes the determination that it is not safe to transmit the sensitive-information utterance ("NO" branch of 502), notification module 220 may, in some examples, generate a notification to user 108 that it may be unsafe to transmit the sensitive-information utterance via the current channel. For example, notification module 220 may generate an audio alert to be output by client device 102 or another device that notifies user 108 that it may be unsafe to transmit the sensitive-information utterance via the current channel. In some examples, notification module 220 may send an email message, text message, app-based notification, or other type of message to a device (e.g., phone, wearable device, etc.) associated with user 108 to notify user 108 that it may be unsafe to transmit the sensitive-information utterance via the current channel. In some examples, notification module 220 (or another unit of guardian system 112) may block the current channel. For instance, notification module 220 may configure guardian system 112 to prevent future use of the current channel for communication with IVS 110 and/or server 114.

Furthermore, or alternatively, if transmission decision module 218 makes the determination that it is not safe to transmit the sensitive-information utterance ("NO" branch of 502), obfuscation module 212 may obfuscate the sensitive-information utterance. In other words, obfuscation module 212 may generate audio data representing a replacement utterance. Obfuscation module 212 may provide the audio data representing the replacement utterance to data handler 214. Data handler 214 may provide the audio data representing the replacement utterance to IVS 110 via communication channel 116. Additionally, obfuscation module 212 may provide the audio data representing the replacement utterance to server communication module 224. Server communication module 224 may provide the audio data representing the replacement utterance to server 114 via secure communication channel 118. For instance, data sent via secure communication channel 118 may be encrypted or otherwise protected from interception. Secure communication channel 118 may be implemented on a communication network, such as the Internet.

In the example of FIG. 5, feedback module 222 may provide feedback to prediction engine 210. Prediction engine 210 may use the feedback generated by feedback module 222 to improve the prediction of occurrences and/or temporal durations of sensitive-information utterances.

Figure 6:
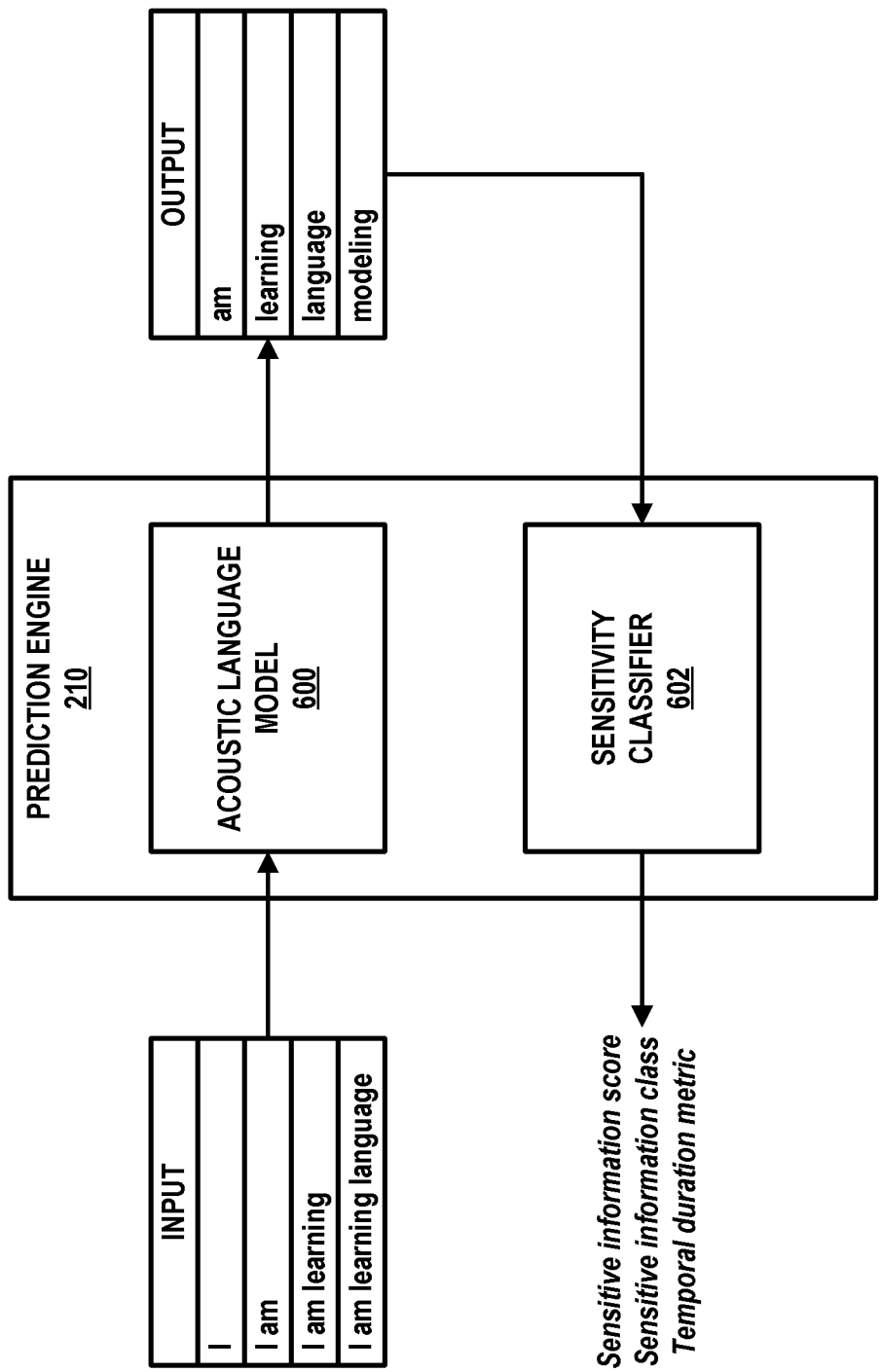
FIG. 6 is a block diagram illustrating an example prediction engine of a guardian system in accordance with one or more techniques of this disclosure.

FIG. 6 is a block diagram illustrating an example prediction engine 210 of guardian system 112 in accordance with one or more techniques of this disclosure. In the example of FIG. 6, prediction engine 210 includes an acoustic language model 600 and a sensitivity classifier 602.

Prediction engine 210 may obtain text based on utterances, such as utterances of user 108, utterances rendered by client device 102, etc. In some examples, guardian system 112 includes a speech-to-text engine that converts the utterances to text. In such examples, the speech-to-text engine may be implemented in accordance with any of the well-known speech-to-text engines or a custom speech-to-text engine. In other examples, IVS 110 generates the text based on the utterances and provides the text to guardian system 112.

Furthermore, prediction engine 210 may determine words of the text within a sliding window of consecutive words. The words within a window may be referred to as an n-gram, where n denotes the number of words that are in a group of consecutive words. Acoustic language model 600 may then determine a most probable word/phrase or type of word/phrase that follows an n-gram. For instance, if n is equal to 3, for a given window W with words $w_1$, $w_2$, and $w_3$, acoustic language model 600 may determine a probability of a next word $w_4$ as $P(w_4|P(w_1, w_2, w_3))$. For example, for the group of words "I", acoustic language model 600 may determine that the most probable next word is "am"; for the group of words "I am", acoustic language model 600 may determine that the most probable next word is "learning"; for the group of words "I am learning", acoustic language model 600 may determine that the most probable next word is "language", and so on. In an example of determining a most probable type of word or phrase, acoustic language model 600 may determine that a next word is a series of numbers for the group of words "social security number is". Acoustic language model 600 may determine the most probable next word based on statistics regarding combinations of words.

Sensitivity classifier 602 may determine a confidence score that indicates a level of confidence that the subsequent utterance will contain sensitive information. For instance, sensitivity classifier 602 may determine based on statistics regarding a corpus of utterances a confidence score that indicates how likely it is that the subsequent utterance contains sensitive information given the utterances that came before the sensitive utterance. For example, the statistics may indicate that there is a sensitive information score (e.g., probability) of 0.98 that the next utterance contains sensitive information if the previous n-gram is "SSN is" or "Social Security Number is".

In some examples, sensitivity classifier 602 may determine a class of sensitive information potentially contained in a subsequent utterance. For example, classes of sensitive information may include social security numbers, bank account numbers, sets of symptoms, diseases, member identification numbers, etc. Sensitivity classifier 602 may determine that an utterance belongs to a class of sensitive information based on statistics regarding a corpus of utterances. For example, the statistics may indicate that there is a confidence score (e.g., probability) of 0.98 that the next utterance is a Social Security Number if the previous n-gram is "SSN is" or "Social Security Number is". In some examples, sensitivity classifier 602 may determine that the subsequent utterance will contain sensitive information in the class of sensitive information with a highest confidence score. In some examples, if the highest confidence score is below a predetermined threshold (e.g., 0.25, 0.5), prediction engine 210 may determine that the subsequent utterance will not contain sensitive information.

In some examples, the temporal duration metric may correspond to a length of time that it would take for user 108 to speak the next word/phrase. In some examples, the temporal duration metric may be the length of the next word/phrase in characters. In some examples, each sensitive information class has a corresponding temporal duration metric. The temporal duration metric for a sensitive information class indicates a typical length of time it takes to say a sensitive-information utterance belonging to the sensitive information class.

Sensitivity classifier 602 may determine the temporal duration metric based on statistics regarding lengths of time it takes to say a corresponding sensitive-information utterance. For example, sensitivity classifier 602 may obtain (e.g., from feedback module 222) information indicating how much time it takes user 108 (or a group of users) to speak the corresponding sensitive-information utterance. In this example, sensitivity classifier 602 may determine that the temporal duration metric based on these times. For instance, sensitivity classifier 602 may determine the temporal duration metric as an average of times, a median of times, a given percentage above the average/median of the times, and so on. Sensitivity classifier 602 may maintain different statistics (and therefore determine different temporal duration metrics) for different classes of sensitive information. In this way, prediction engine 210 may determine an expected temporal duration of an utterance.

As noted above, prediction engine 210 may use the feedback generated by feedback module 222 to improve the prediction of the occurrence and/or duration of sensitive-information utterances. For example, feedback module 222 may determine words in sounds generated by user 108 and update statistics regarding the probabilities of n-grams used by acoustic language model 600 based on the determined words. In some examples, feedback module 222 may determine temporal durations for uttering sensitive-information utterances. Prediction engine 210 may update a temporal duration metric based on the determined temporal durations for uttering sensitive-information utterances.

Figure 7:
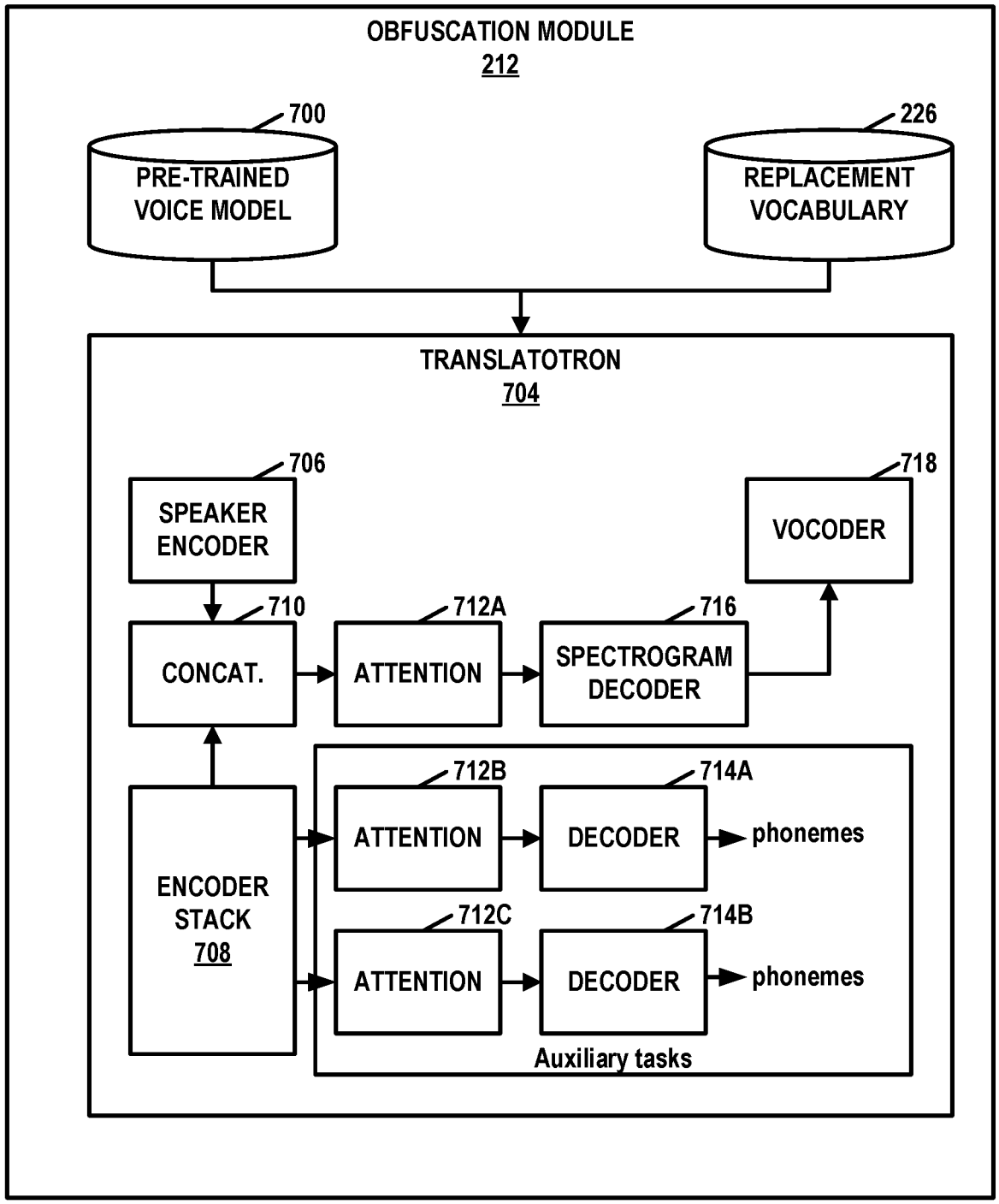
FIG. 7 is a block diagram illustrating an example obfuscation module of a guardian system in accordance with one or more techniques of this disclosure.

FIG. 7 is a block diagram illustrating an example obfuscation module 212 of guardian system 112 in accordance with one or more techniques of this disclosure. In the example of FIG. 7, obfuscation module 212 includes a pre-trained voice model 700, replacement vocabulary 226, and a translatotron 704. Pre-trained voice model 700 contains data for representing the acoustic qualities of the voice of user 108. Example acoustic qualities may include fundamental frequency, pitch, volume, timbre, tone, and so on. Replacement vocabulary 226 may include data indicating words that obfuscation module 212 may use as a replacement for a sensitive-information utterance.

In some examples, replacement vocabulary 226 may include one or more predetermined replacement utterances for each class of sensitive information of a plurality of classes of sensitive information. As described elsewhere in this disclosure, prediction engine 210 may determine a class of sensitive information for a subsequent utterance. For instance, prediction engine 210 may determine a confidence score for each of the classes of sensitive information and determine that the subsequent utterance will contain sensitive information belonging to the class of sensitive information having the greatest confidence score. Obfuscation module 212 may select one of the predetermined replacement utterances for the determined class of sensitive information as the replacement utterance for the subsequent, sensitive-information utterance.

As mentioned above, replacement vocabulary 266 may include one or more t-VRS's. The t-VRS's may correspond to different classes of sensitive information. Obfuscation module 212 may determine the t-VRS of the class of sensitive information for the subsequent utterance. Obfuscation module 212 may replace the words of the subsequent utterance with words in the determined t-VRS, thereby generating a replacement utterance. For example, obfuscation module 212 may use a hash function to determine hash values corresponding to words of the subsequent utterance. Obfuscation module 212 may then use the hash values to look up words in the determined t-VRS that correspond to the hash values. The replacement utterance may include the looked-up words. In another example, obfuscation module 212 may use a next available word in the determined t-VRS that was not previously used as a word in the replacement utterance. Obfuscation module 212 may provide the replacement utterance as input to translatotron 704.

In the example of FIG. 7, translatotron 704 includes a speaker-encoder 706, an encoder stack 708, a concatenation unit 710, attention units 712A, 712B, 712C (collectively, "attention units 712"), decoder units 714A, 714B (collectively, "decoder units 714"), spectrogram decoder 716, and a vocoder 718.

Speaker-encoder 706 is a component that may condition spectrogram decoder 716 on a speaker's voice (e.g., the voice of user 108). In other words, speaker-encoder 706 may identify the speaker's voice characteristics, which spectrogram decoder 716 may later use to generate output that sounds similar to the original speaker. This may make the translated speech sound more natural and less jarring. In some examples, speaker-encoder 706 may apply a Fast Fourier transform (FFT) to digital audio samples of the voice of user 108 to generate spectrograms of the voice of user 108. The spectrograms generated by speaker-encoder 706 may form part of pre-trained voice model 700.

Encoder stack 708 may comprise a sequence-to-sequence encoder stack that takes a log-mel spectrogram as input and generates a vector of hidden states. The log-mel spectrogram corresponds to a time-step of an utterance (e.g., a sensitive-information utterance of user 108). A mel spectrogram is a spectrogram where the frequencies are converted to the 'mel scale'. In some examples, encoder stack 708 may map an 80-channel log-mel spectrogram into a vector of hidden states. The vector of hidden states may represent an encoded spectrogram for an obfuscated sensitive-information utterance. Encoder stack 708 may use the replacement utterance when generating the encoded spectrogram. For instance, internal layers of encoder stack 708 may generate values that map to words or phrases in the replacement utterance. Subsequent layers of encoder stack 708 may then map the mapped words or phrases back to a vector of hidden states for the time-step corresponding to the input log-mel spectrogram.

Translatotron 704 may pass these hidden states through an attention-based alignment mechanism (i.e., attention units 712) to condition an autoregressive decoder (e.g., spectrogram decoder 716 or decoder 714A, 714B). Encoder stack 708 may be implemented as a stack of bidirectional long-short term memory (LSTM) layers (e.g., a stack of 8 bidirectional LSTM layers or another number of bidirectional LSTM layers). Concatenation unit 710 may concatenate the output of speaker-encoder 706 with the output of encoder stack 708. Attention is a type of input processing technique for neural networks. Attention enables neural networks (such as neural networks implemented in decoders 714 and spectrogram decoder 716) to focus on a subset of a complex input dataset or features. Attention mechanisms may be helpful in alignment of sequential data such as speech, text, etc.

Spectrogram decoder 716 may be an autoregressive decoder that takes, as input for each time-step, attention data, hidden states from encoder stack 708 (i.e., an encoded spectrogram) for the time-step, output of speaker-encoder 706, and output of spectrogram decoder 716 for a previous time-step. The output of spectrogram decoder 716 may refer to the output of spectrogram decoder 716 as a "target spectrogram." The target spectrogram represents sounds of a replacement utterance for the current time-step. Because spectrogram decoder 716 uses the output of speaker-encoder 706 as input, the replacement utterance may have vocal characteristics of user 108. In an example where encoder stack 708 maps an 80-channel log-mel spectrogram into a vector of hidden states, spectrogram decoder 716 may generate 1025-dimensional log spectrogram frames corresponding to generated speech. Spectrogram decoder 716 may be implemented with pre-net, autoregressive LSTM stack, and post-net components. Vocoder 718 transforms the target spectrogram to a time domain waveform that represents speech. Because the target spectrograms have vocal characteristics of user 108, the voice represented in the time-domain waveforms generated by vocoder 718 may sound like user 108.

Translatotron 704 may use decoders 714 to generate sequences of phonemes based on intermediate output of encoder stack 708. For instance, decoder 714A may generate a sequence of phonemes represented by a sensitive-information utterance. Decoder 714B may generate a sequence of phonemes in a replacement utterance. Loss values may be calculated based on the sequences of phonemes during training of encoder stack 708. The loss values may then be used for training encoder stack 708. Each of decoders 714 may be an LSTM decoder. For instance, decoders 714 may be 2-layer LSTMs with single-head additive attention. Decoders 714 and spectrogram decoder 716 may use attention dropout and LSTM zoneout regularization, e.g., with a probability of 0.1.

In some examples, rather than use translatotron 704, obfuscation module 212 may be configured with a plurality of voice profiles. Obfuscation module 212 may compare one or more characteristics of the voice of user 108 to characteristics of the voice profiles. Obfuscation module 212 may then select one of the voice profiles that most closely corresponds to the voice of user 108. Obfuscation module 212 may then apply a text-to-speech engine (such as any of the known text-to-speech engines known in the art) to convert utterances, including replacement utterances, into audio data using the selected voice profile. In this way, obfuscation module 212 may generate replacement audio data. Because the utterances, including replacement utterances, are generated using the text-to-speech engine, it may not be possible to determine that the resulting speech includes an obfuscated utterance.

Figure 8:
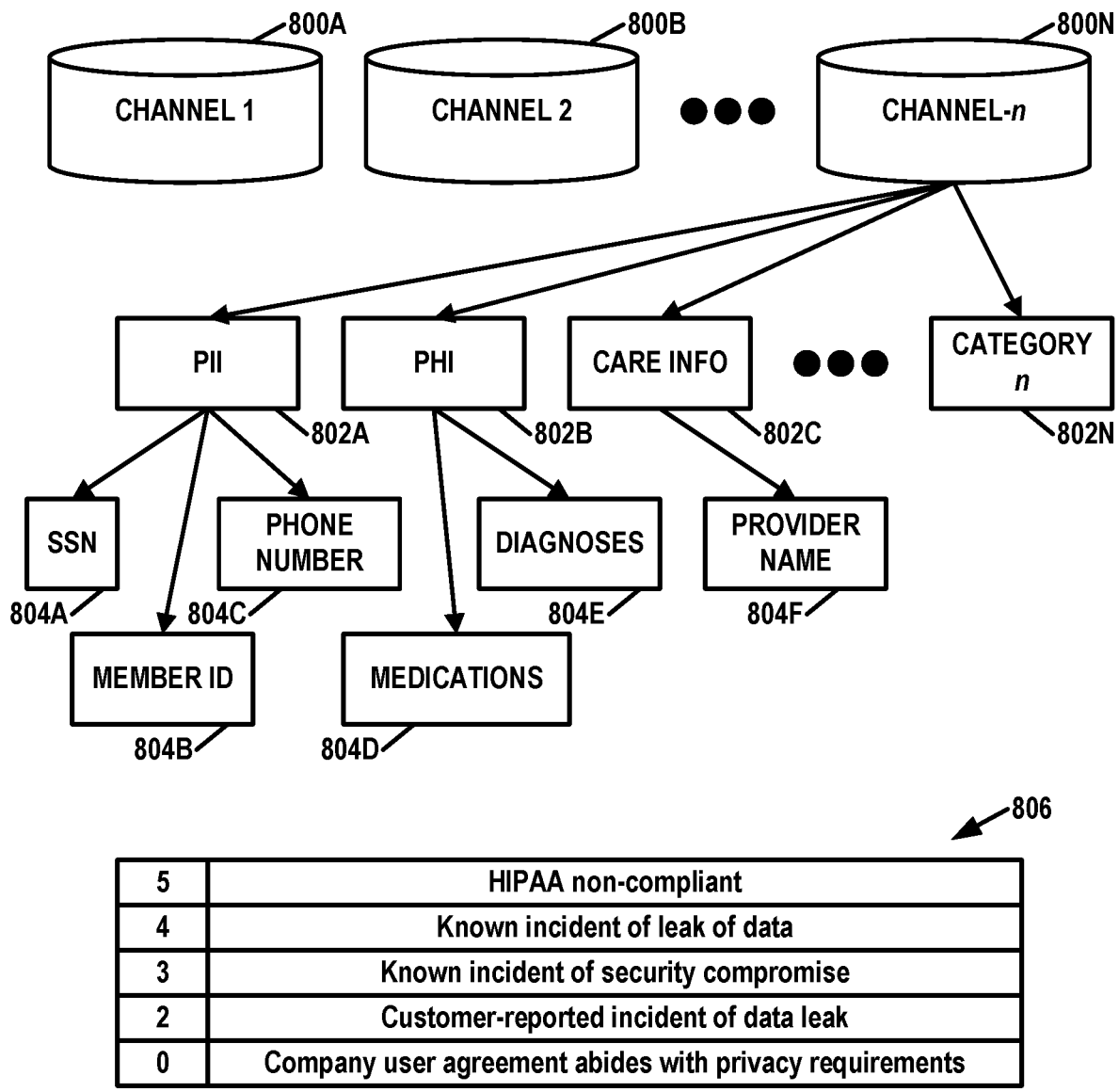
FIG. 8 is a conceptual diagram illustrating an example hierarchy of sensitive information for use by a channel profiler in accordance with one or more techniques of this disclosure.

FIG. 8 is a conceptual diagram illustrating an example hierarchy of sensitive information for use by channel profiler 216 in accordance with one or more techniques of this disclosure. In the example of FIG. 8, channel profiler 216 stores risk profiles 800A-800N (collectively, "risk profiles 800") for a plurality of channels. Each of risk profiles 800 corresponds to a different channel through which information can be conveyed from user 108 to server 114. Example types of channels may include different types of voice assistant systems, different web applications, different native applications, and so on.

Each of risk profiles 800 may include data regarding categories 802A-802N (collectively, "categories 802"). Each of categories 802 represents a different type of sensitive information. For instance, category 802A represents personally identifiable information (PII), category 802B represents patient health information (PHI), category 802C represent care information, category 802N may represent another category of sensitive information.

In the example of FIG. 8, category 802A (PII) includes risk nodes 804A, 804B, and 804C. Category 802B (PHI) includes risk nodes 804D and 804E. Category 802C (care information) includes risk node 804F. Category 802N may include other risk nodes, which are not shown in the example of FIG. 8 for the purpose of clarity. Risk nodes 804A-804F may be referred to collectively as "risk nodes 804." Each of risk nodes 804 may correspond to a specific class of sensitive information. For instance, in the example of FIG. 8, risk nodes 804A through 804F correspond to a Social Security Number (SSN), a member identifier (where a member may be a health insurance policyholder), a phone number, a list of medications, a list of diagnoses, and a healthcare provider name, respectively.

Each of risk nodes 804 is associated with a risk score in a scoring system. FIG. 8 shows an example scoring system 806. In scoring system 806, higher risk scores are associated with higher risk. For example, scoring system 806 associates a risk node with a risk score of 5 when a channel (e.g., channel 800N in the example of FIG. 8) is regulatory (e.g., Health Insurance Portability and Accountability Act (HIPAA), Personal Information Protection and Electronic Documents Act (PIPEDA, etc.) non-compliant with respect to the information corresponding to the risk node. Scoring system 806 associates the risk node with a risk score of 4 when the channel is associated with a known incident of a leak of data corresponding to the risk node. Scoring system 806 associates the risk node with a risk score of 3 when the channel is associated with a known incident of a security compromise with respect to the data corresponding to the risk node. Scoring system 806 associates the risk node with a risk score of 2 when there is a customer-reported incident of a data leak of the data corresponding to the risk node on the channel. Scoring system 806 associates the risk node with a risk score of 0 when a company user agreement abides with privacy requirements with respect to the data corresponding to the risk node. In other examples, higher risk scores are associated with lower risk.

As discussed elsewhere in this disclosure, prediction engine 210 may determine that a subsequent utterance is a sensitive-information utterance and may determine a class of the sensitive-information utterance. Channel profiler 216 may determine, based on scoring system 806, the risk score for the risk node corresponding to the class of the sensitive-information utterance. If the risk score for the risk node is above (or in other examples, below) a threshold, transmission decision module 218 may determine that the sensitive-information utterance cannot be transmitted on the channel. For example, prediction engine 210 may determine that a sensitive-information utterance is a phone number. In this example, transmission decision module 218 may determine whether a risk score for risk node 804C (which corresponds to phone numbers) is above (or in other examples, below) a threshold. In this example, if the risk score for the risk node 804C is above (or in other examples, below) the threshold, transmission decision module 218 may make a determination not to transmit the sensitive-information utterance. Otherwise, transmission decision module 218 may make a determination to transmit the sensitive-information utterance.

There may be different thresholds for different risk nodes 804. For instance, with respect to scoring system 806, the threshold for risk node 804A (Social Security Number) may be 2, the threshold for risk node 804B (member identifier) may be 3, the threshold for risk node 804C (phone number) may be 4, and so on.

In some examples, transmission decision module 218 may determine whether to transmit the sensitive-information utterance via the channel based on risk scores for multiple risk nodes 804. For example, transmission decision module 218 may add the risk scores for risk nodes in a category (e.g., one of categories 802). In this example, if the sensitive-information utterance is in any class within the category and the risk score for any risk node (or at least a given number of risk nodes) within the category is above (or in other examples, below) a threshold, transmission decision module 218 may make a determination not to transmit the sensitive-information utterance via the channel. In some examples, if any risk node (or at least a given number of risk nodes) in any category has a risk score above (or in other examples, below) a threshold, transmission decision module 218 may make a determination not the transmit the sensitive-information utterance via the channel.

In some examples, there may be different scoring systems 806 for different risk nodes 804. For example, a scoring system for one of risk nodes 804 may have values ranging from 0 to 3 and a scoring system for another one of risk nodes 804 may have values ranging from 0 to 10. Accordingly, in such examples, transmission decision module 218 may normalize the risk scores for risk nodes.

In some examples, transmission decision module 218 may determine whether to transmit an utterance on a channel based on a risk score for the channel and based on a confidence score for the utterance. In this example, the risk score for the channel may be the highest risk score of any of risk nodes 804. The confidence score for the utterance may correspond to a level of confidence that the utterance is a sensitive-information utterance. Prediction engine 210 may generate the confidence score. In some examples, the confidence score is a value in a range of [0, 1]. In some examples, transmission decision module 218 determines a combined score based on the risk score for the channel and the confidence score for the utterance. For instance, in some examples, transmission decision module 218 may determine the combined score as the risk score for the channel multiplied by the confidence score for the utterance. Transmission decision module 218 may determine, based on a comparison of the combined score to a threshold, whether to transmit the utterance via the channel. For example, transmission decision module 218 may make a determination not to transmit the utterance via the channel based on the combined score being greater than the threshold.

In some examples, each of risk nodes 804 corresponds to a different class of sensitive information and prediction engine 210 may determine confidence scores for the utterance for each of the classes of sensitive information. For example, prediction engine 210 may determine a confidence score of 0.8 for the member identifier class (risk node 804B), a confidence score of 0.1 for the phone number class (risk node 904C), etc. Additionally, transmission decision module 218 may determine a separate risk score for the channel for each class of sensitive information. The risk scores for the channel for the classes of sensitive information may be normalized across the classes of sensitive information. In this example, transmission decision module 218 may determine separate combined scores for each class of sensitive information. For instance, for each class of sensitive information, transmission decision module 218 may determine a combined score for the class of sensitive information by multiplying the risk score for the channel for the class of sensitive information by the confidence score for the class of sensitive information. Furthermore, transmission decision module 218 may determine an overall combined score for the channel as a maximum of the combined scores for the classes of sensitive information. Transmission decision module 218 may determine, based on a comparison of the overall combined score for the channel to a threshold, whether to transmit the utterance via the channel. For example, transmission decision module 218 may make a determination not to transmit the utterance via the channel based on the overall combined score for the channel being greater than the threshold. In this way, the decision of whether to transmit an utterance may be based on a combination of the confidence that the utterance is a sensitive-information utterance and a risk of disclosure of the sensitive-information utterance on the channel.

As described elsewhere in this disclosure, notification module 220 may generate a notification to user 108 in response to a determination that an utterance is not safe to transmit on a channel. In some examples, there may be different notifications depending on the class of sensitive information, combined score for the channel, combined score for the channel for the class of sensitive information, and/or other factors. For example, notification module 220 may generate a warning tone or beep with a speed or intensity that is derived from the class of sensitive information, combined score for the channel, and/or the combined score for the channel for the class of sensitive information. In some examples, notification module 220 may change a tone of the assistant based to indicate risk. In other words, notification module 220 may change vocal characteristics and/or word choice of the assistant based on the risk, e.g., to convey confidence, worry, uncertainty, or other emotional tone. In some examples, notification module 220 may generate a visual notification to user 108 in response to a determination that an utterance is not safe to transmit on a channel. For example, notification module 220 may change a color of a light (e.g., from green to amber to red) based on the class of sensitive information, combined score for the channel, or the combined score for the channel for the class of sensitive information. In some examples, if the channel is an application on a mobile device or a browser window, notification module 220 may modify a graphical user interface to indicate a risk that the utterance may not be safe to transmit on the channel (e.g., based on the class of sensitive information, combined score for the channel, and/or the combined score for the channel for the class of sensitive information). In some examples, notification module 220 may cause a vibration unit of a device (e.g., client device 102) to vibrate at a frequency that is based on the class of sensitive information, combined score for the channel, and/or the combined score for the channel for the class of sensitive information.

Figure 9:
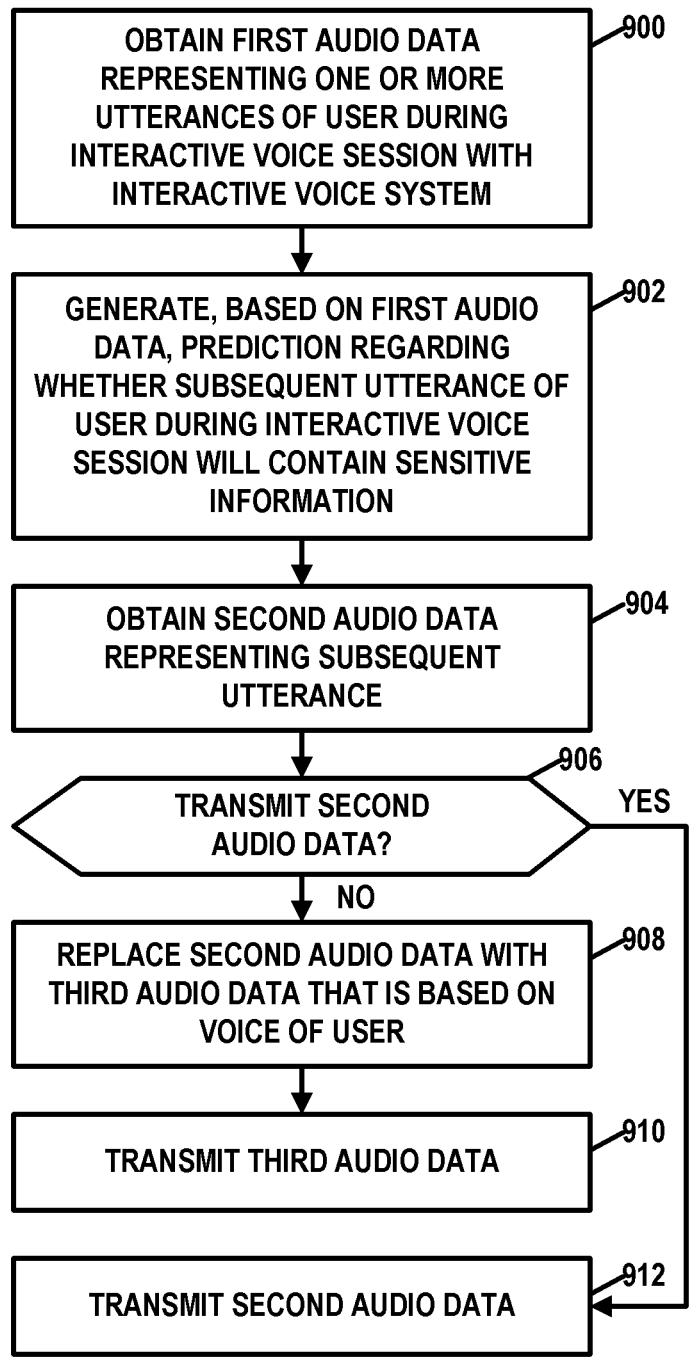
FIG. 9 is a flowchart illustrating an example operation in accordance with one or more techniques of this disclosure.

FIG. 9 is a flowchart illustrating an example operation in accordance with one or more techniques of this disclosure. Although the example of FIG. 9 is described with respect to the examples of the previous figures, the operation of FIG. 9 is not so limited.

In the example of FIG. 9, guardian system 112 may obtain first audio data representing one or more initial utterances during an interactive voice session with IVS 110 (900). As discussed elsewhere in this disclosure, IVS 110 may be or include a voice assistant system. Additionally, prediction engine 210 of guardian system 112 may generate, based on the first audio data, a prediction regarding whether a subsequent utterance of user 108 during the interactive voice session will contain sensitive information, the subsequent utterance following the one or more initial utterances in time (902). For example, the prediction may include a confidence score that indicates a level of confidence that the subsequent utterance will include a particular class of sensitive information.

Furthermore, guardian system 112 may obtain second audio data representing the subsequent utterance (904). For instance, guardian system 112 may obtain the second audio data after generating the prediction regarding whether the subsequent utterance of user 108 will contain the sensitive information.

Guardian system 112 may determine, based on the prediction, whether to transmit the second audio data (906). For instance, in some examples, as part of generating the prediction, prediction engine 210 may determine a confidence score that indicates a level of confidence that the subsequent utterance will contain the sensitive information. Prediction engine 210 may determine the confidence score as described elsewhere in this disclosure. In such examples, transmission decision module 218 may determine whether to transmit the second audio data based on a comparison of the confidence score and a threshold. For instance, transmission decision module 218 may make a determination to transmit the second audio data based on the confidence score being lower than the threshold. Transmission decision module 218 may make a determination not to transmit the second audio data based on the confidence score being greater than the threshold. In some examples, transmission decision module 218 may determine, based on the prediction and based on a risk profile of IVS 110, whether to transmit the second audio data to IVS 110.

Based on a determination not to transmit the second audio data ("NO" branch of 906), guardian system 112 may replace the second audio data with third audio data that is based on a voice of user 108 (908). Furthermore, prediction engine 210 may determine an expected temporal duration of the subsequent utterance. Prediction engine 210 may generate the third audio data based on the expected temporal duration of the subsequent utterance. In some examples, the third audio data represents an alternative, replacement utterance. In some examples, prediction engine 210 may synthesize the third audio data based on a predetermined replacement utterance and based on a spectrogram of the voice of user 108. Furthermore, obfuscation module 212 may determine, based on the first audio data, a class of the sensitive information. Obfuscation module 212 may generate the third audio data, where the third audio data represents an utterance containing replacement utterance in the same class of sensitive information. In some examples, obfuscation module 212 may generate a spectrogram of the voice of user 108 and generate the third audio data based on the spectrogram of the voice of user 108.

Additionally, guardian system 112 may transmit the third audio data (910). For instance, guardian system 112 may transmit the first audio data and the third audio data to IVS 110 and not transmit the second audio data to IVS 110. In other examples, guardian system 112 may obtain the first audio data from the IVS 110, obtain the second audio data from IVS 110, and transmit the third audio data to server 114.

Otherwise, if guardian system 112 makes the determination to transmit the second audio data ("YES" branch of 906), guardian system 112 may transmit the second audio data (912). For instance, guardian system 112 may transmit the second audio data to IVS 110 or server 114.

Figure 10:
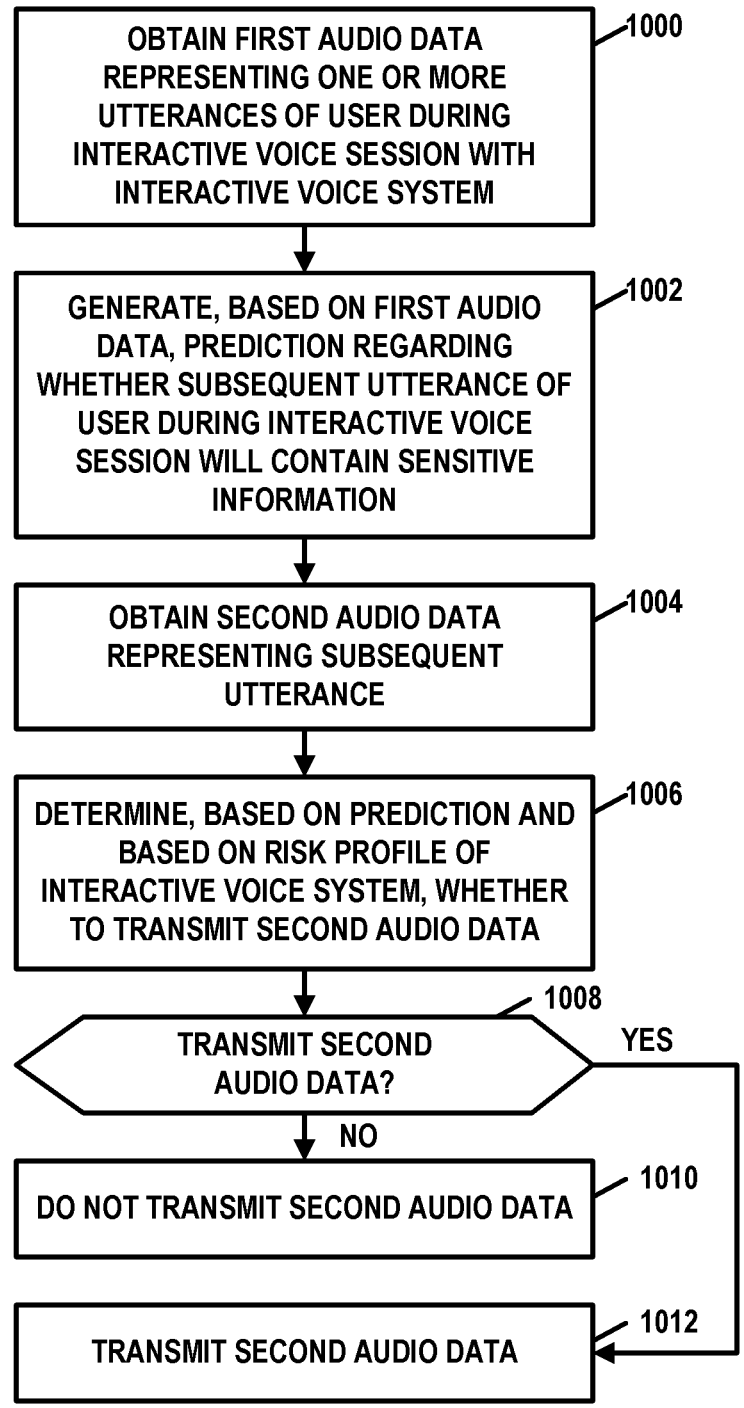
FIG. 10 is a flowchart illustrating an example operation in accordance with one or more techniques of this disclosure.

FIG. 10 is a flowchart illustrating an example operation in accordance with one or more techniques of this disclosure. Although the example of FIG. 10 is described with respect to the examples of the previous figures, the operation of FIG. 10 is not so limited.

In the example of FIG. 10, guardian system 112 obtains first audio data representing one or more initial utterances during an interactive voice session with IVS 110 (1000). Although referred to as initial utterances for convenience, guardian system 112 may process utterances in the interactive voice session before these initial utterances.

Additionally, prediction engine 210 of guardian system 112 may generate, based on the first audio data, a prediction regarding whether a subsequent utterance of user 108 in the interactive voice session will contain sensitive information (1002). The subsequent utterance follows the one or more initial utterances in time.

Guardian system 112 may obtain second audio data representing the subsequent utterance (1004). For instance, guardian system 112 may obtain the second audio data from client device 102, from a microphone of client device 102, from a microphone of another device, or obtain the second audio data in another way.

Furthermore, guardian system 112 may determine, based on the prediction and based on a risk profile of IVS 110, whether to transmit the second audio data to the interactive voice system (1006). In some examples, the risk profile of IVS 110 includes a risk score for the interactive voice system for a class of sensitive information. In such examples, the prediction is a prediction regarding whether the subsequent utterance of user 108 in the interactive voice session will contain sensitive information in the class of sensitive information. As described above with respect to the example of FIG. 8, the risk score for IVS 110 for the class of sensitive information is based on at least one of: regulatory (e.g., HIPAA) compliance with respect to the class of sensitive information, a known leak of data in the class of sensitive information involving the interactive voice system, a known incident of a security compromise involving the interactive voice system with respect to the class of sensitive information, a customer-reported incident of a data leak involving the interactive voice system with respect to the class of sensitive information, or compliance of the interactive voice system with privacy requirements with respect to the class of sensitive information.

Furthermore, in some examples, the class of sensitive information is one of a plurality of classes of sensitive information. For each respective class of sensitive information in the plurality of classes of sensitive information, the risk profile of IVS 110 includes a respective risk score for IVS 110 for the respective class of sensitive information. For each respective class of sensitive information in the plurality of classes of sensitive information, prediction engine 210 may generate a respective confidence score for the respective class of sensitive information indicating a level of confidence that the subsequent utterance of user 108 in the interactive voice session will contain sensitive information in the class of sensitive information. In this example, as part of determining whether to transmit the second audio data to IVS 110, transmission decision module 218 may determine, for each respective class of sensitive information in the plurality of classes of sensitive information, based on the risk score for the interactive voice system for the respective class of sensitive information and the confidence score for the respective class of sensitive information, a combined score for the respective class of sensitive information. Transmission decision module 218 may determine, based on the combined scores for the classes of sensitive information, whether to transmit the second audio data. For instance, transmission decision module 218 may determine a maximum combined score among the combined scores for the classes of sensitive information and may determine whether to transmit the second audio data based on a comparison of the maximum combined score and a threshold.

Based on a determination not to transmit the second audio data to IVS 110 ("NO" branch of 1008), guardian system 112 does not transmit the second audio data to IVS 110 (1010). Based on a determination to transmit the second audio data to IVS 110 ("YES" branch of 1008), guardian system 112 may transmit the second audio data to the interactive voice system (1012).

Figure 11:
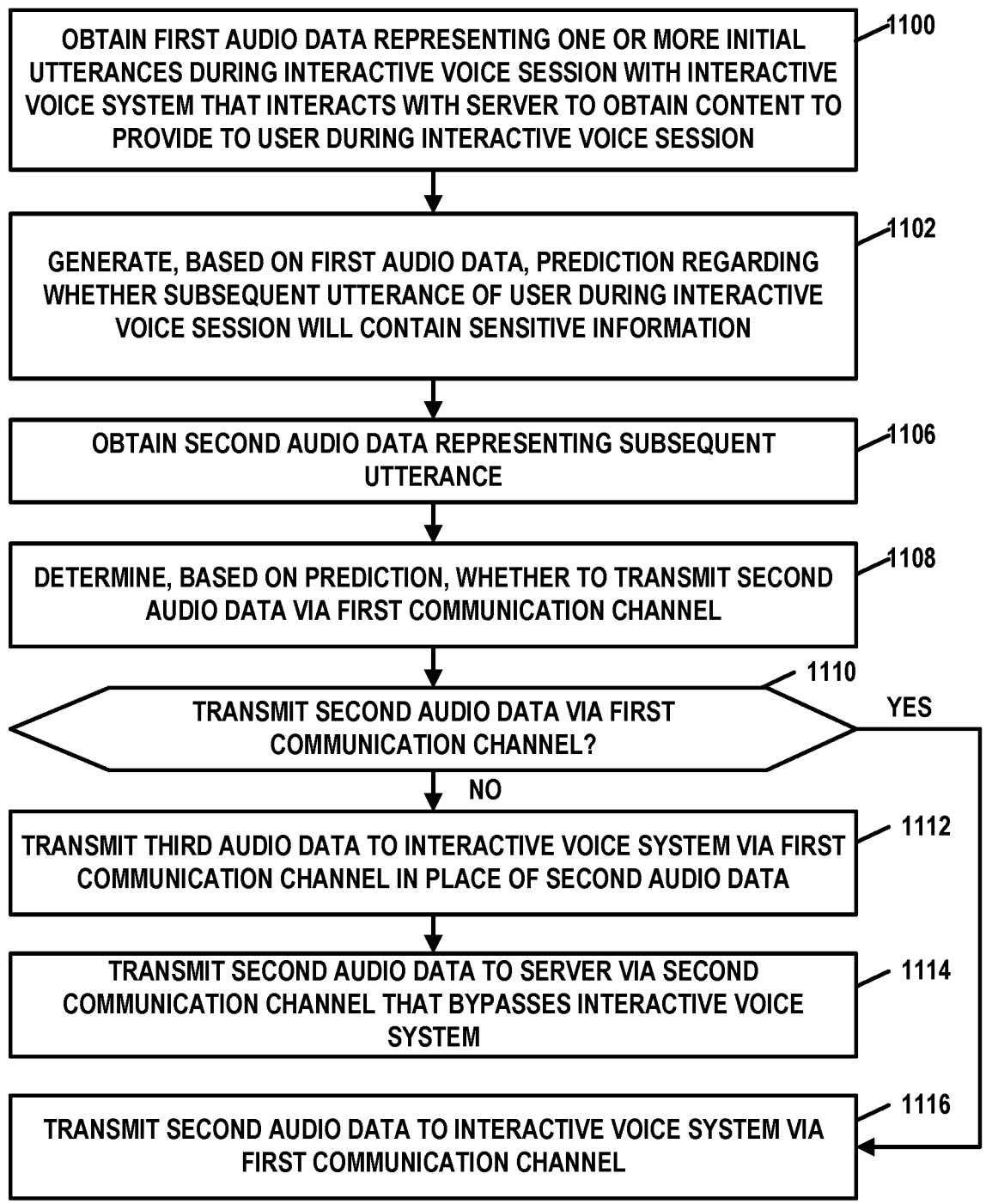
FIG. 11 is a flowchart illustrating an example operation that sends audio data containing a sensitive-information utterance via a communication channel that bypasses an interactive voice system, in accordance with one or more techniques of this disclosure.

FIG. 11 is a flowchart illustrating an example operation that sends audio data containing a sensitive-information utterance via a communication channel that bypasses an interactive voice system, in accordance with one or more techniques of this disclosure. Although the example of FIG. 11 is described with respect to the examples of the previous figures, the operation of FIG. 11 is not so limited.

In the example of FIG. 11, local voice assistant 113 of client device 102 may obtain first audio data representing one or more initial utterances during an interactive voice session with IVS 110 (1100). The interactive voice session may be associated with a unique session identifier based on an identity of user 108, a skill involved with the interactive voice session, and a timestamp. IVS 110 interacts with server 114 to obtain content to provide to user 108 during the interactive voice session. In other examples, server 114 comprises an application that operates on a second computing system (e.g., front-end computing system 104) that also implements IVS 110.

Local voice assistant 113 may provide the first audio data to guardian system 112. Guardian system 112 may generate, based on the first audio data, a prediction regarding whether a subsequent utterance of user 108 in the interactive voice session will contain sensitive information (1102). The subsequent utterance follows the one or more initial utterances in time. Guardian system 112 may generate the prediction as described in any of the examples provided elsewhere in this disclosure. In some examples, guardian system 112 may then transmit the first audio data to IVS 110 via a first communication channel (e.g., communication channel 116). For example, guardian system 112 may transmit the first audio data to IVS 110 via an Internet connection.

Additionally, local voice assistant 113 of guardian system 112 may obtain second audio data representing the subsequent utterance (1106). For instance, microphone 207 of client device 102 may generate signals representing the second audio data based on soundwaves, client device 102 may convert the signals to the second audio data, and local voice assistant 113 may provide the second audio data to guardian system 112.

Guardian system 112 may determine, based on the prediction, whether to transmit the second audio data to IVS 110 via the first communication channel (1108). For example, based on a determination that the prediction indicates that the second audio data will contain sensitive information, guardian system 112 may make the determination not to transmit the second audio data to IVS 110 via the first communication channel. In some examples, guardian system 112 may determine based on the prediction and based on a risk profile of IVS 110, whether to transmit the second audio data to IVS 110 via communication channel 116. Guardian system 112 may make this determination in the same manner as described above, e.g., with respect to action (1006) of FIG. 10.

Based on a determination not to transmit the second audio data to IVS 110 via the first communication channel ("NO" branch of 1110), guardian system 112 may transmit third audio data to IVS 110 via the first communication channel in place of the second audio data (1112). The third audio data may comprise audio data that replaces the sensitive-information utterance. In other words, the third audio data may comprise audio data that represents a replacement utterance. In some examples, the third audio data is based on a voice of user 108. In other words, the third audio data sounds like user 108. Guardian system 112 may obtain one or more t-VRS's for the interactive voice session from server 114. Guardian system 112 may generate the third audio data based on words in one of the t-VRS's for the current interactive voice session. For example, guardian system 112 may determine a class of sensitive information in the second audio data. Guardian system 112 may then use the determined t-VRS to determine a sequence of one or more replacement words (i.e., the replacement utterance). Guardian system 112 may then convert the replacement utterance into the third audio data. In some examples, to use the determined t-VRS to determine the replacement utterance, guardian system 112 may apply a hash function to the sensitive-information to obtain one or more hash values. For instance, guardian system 112 may obtain a hash value for each word of the sensitive-information utterance. Guardian system 112 may then use determine the one or more replacement words of the replacement utterance as the words in the determined t-VRS that correspond to the hash values.

Additionally, guardian system 112 may transmit the second audio data to server 114 via a second communication channel (e.g., secure communication channel 118) that bypasses IVS 110 (1114). The second audio data may include the sensitive-information utterance. This second communication channel may be specific to an instance of guardian system 112 and server 114 and may be linked to a unique session identifier in server 114. In some examples, guardian system 112 may also transmit to server 114 information indicating one or more of a class of the sensitive-information utterance, a timestamp of the sensitive-information utterance, an identifier of the determined t-VRS, and/or other information.

On the other hand, based on a determination to transmit the second audio data to IVS 110 via the first communication channel ("YES" branch of 1110), guardian system 112 may transmit the second audio data to IVS 110 via the first communication channel (1116). Server 114 may maintain a mapping between the semantic content of the second audio data and the semantic content of the third audio data. Thus, when server 114 obtains the semantic content of the third audio data from IVS 110 (or the third audio data itself from IVS 110), server 114 may be able to perform an action based on the second audio data instead of the third audio data. In this way, receiving the semantic content of the third audio data from IVS 110 (or the third audio data itself from IVS 110) may prompt server 114 to perform the action.

Figure 12:
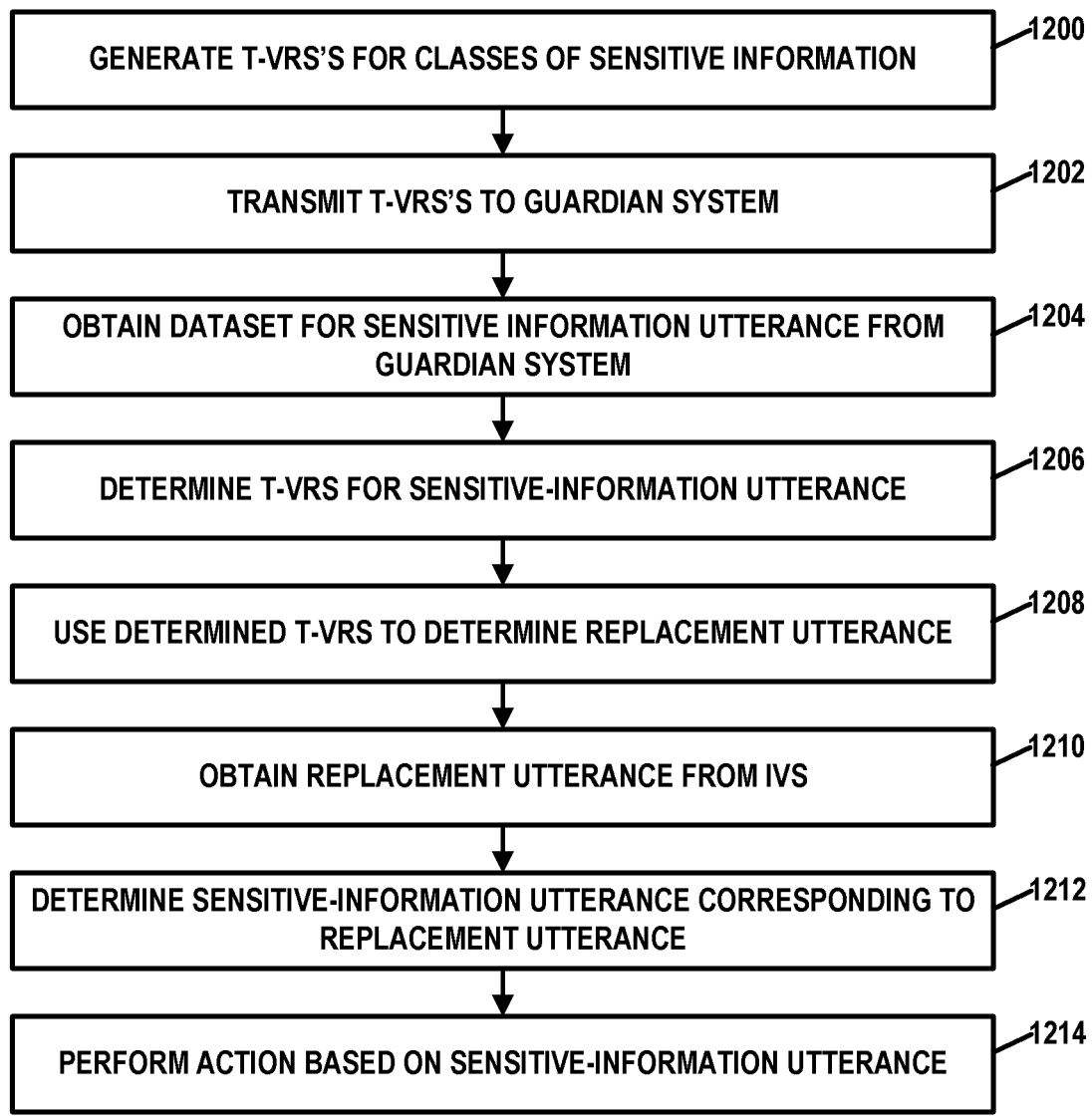
FIG. 12 is a flowchart illustrating an example of operation of a server, in accordance with one or more techniques of this disclosure.

FIG. 12 is a flowchart illustrating an example of operation of server 114, in accordance with one or more techniques of this disclosure. Although the example of FIG. 12 is described with respect to the examples of the previous figures, the operation of FIG. 12 is not so limited.

In the example of FIG. 12, vocabulary generation unit 412 of server 114 may generate t-VRS's for different classes of sensitive information (1200). Additionally, vocabulary generation unit 412 may transmit the t-VRS's for the current interactive voice session to guardian system 112 after the communication channel between guardian system 112 and server 114 is established (1202). Vocabulary generation unit 412 may generate and transmit the t-VRS's in accordance with any of the examples provided elsewhere in this disclosure.

Furthermore, in the example of FIG. 12, server 114 may obtain a dataset for a sensitive-information utterance (1204). For instance, server 114 may receive the dataset from guardian system 112 via secure communication channel 118. The dataset may include audio data representing a replacement utterance, audio data representing the sensitive-information utterance, a timestamp, an identifier of a t-VRS. Server 114 may store the dataset for the sensitive-information utterance in a sensitive information data store, e.g., a sensitive information queue.

Additionally, classification unit 414 of server 114 may determine a t-VRS for the sensitive-information utterance (1206). For instance, classification unit 414 may use the identifier of the t-VRS indicated in the dataset to determine the t-VRS for the sensitive information utterance. In some examples, classification unit 414 may analyze the sensitive-information utterance to determine a class of sensitive information, and hence a corresponding t-VRS.

Reidentification unit 416 of server 114 may use the determined t-VRS to determine a replacement utterance (1208). For example, reidentification unit 416 may generate hash values for words in the replacement utterance. Reidentification unit 416 may then look up the words corresponding to the hash values in the determined t-VRS. Reidentification unit 416 may store the looked-up words in the dataset for the sensitive-information utterance as the replacement utterance. In this way, reidentification unit 416 may store mapping data 420 that maps replacement utterances to sensitive-information utterances.

Reidentification unit 416 of server 114 may obtain a replacement utterance from IVS 110 (1210). In other words, content unit 418 may obtain semantic content of the audio data from IVS 110. In some examples, IVS 110 may apply natural language processing to audio data received from local voice assistant 113 to obtain the semantic content of the audio data (e.g., the replacement utterance) and may then forward the replacement utterance to server 114. In some examples, IVS 110 may apply natural language processing to the audio data and generate structured data (e.g., semantic markup) of the transcription generated by applying natural language processing. In such examples, IVS 110 may send the structured data, which contains the semantic content of the audio data, to server 114. In some examples, server 114 obtains the audio data from IVS 110 and NLU unit 410 of server 114 may determine the semantic content of the audio data (i.e., determines the replacement utterance) based on the audio data. In some examples, NLU unit 410 may apply natural language processing to the audio data from guardian system 112 to obtain a sensitive-information utterance and a replacement utterance.

Reidentification unit 416 may analyze the stored datasets (e.g., mapping data 420) to determine a sensitive-information utterance corresponding to the replacement utterance (1212). For example, the sensitive information utterance may be that a user's birthdate is Jan. 1, 1966, and the replacement utterance may indicate that the user's birthdate is Jul. 28, 1950. In this example, reidentification unit 416 may generate hash values based on "Jan. 1, 1966" and look up the words corresponding to the hash values in the identified t-VRS. In this example, the words corresponding to the hash values in the identified t-VRS are "Jul. 28, 1950." Thus, when reidentification unit 416 receives the replacement utterance from IVS 110 indicating "Jul. 28, 1950," reidentification unit 416 may identify the dataset indicating "Jul. 28, 1950" and therefore determine that the true sensitive information utterance to use is Jan. 1, 1966.

Content unit 418 may then perform an action based on the sensitive-information utterance (1214). Content unit 418 may determine the action in various ways. For example, content unit 418 may determine the action based on a set of business rules (e.g., if-then-else style rules) that indicate what action to perform. In other examples, server 114 may use a machine-learning model to determine the action to perform. Example actions may include generating specific content to provide to user 108 during the interactive voice session. In some examples, the action may include writing specific data to a database, retrieving data from a database, initiating a voice communication with a human operator, or other actions.

The following is a non-limiting list of aspects that are in accordance with one or more techniques of this disclosure.

Aspect 1: A method includes obtaining, by a computing system, first audio data representing one or more initial utterances during an interactive voice session with an interactive voice system that interacts with a server to obtain content to provide to a user during the interactive voice session; generating, by the computing system, based on the first audio data, a prediction regarding whether a subsequent utterance of the user in the interactive voice session will contain sensitive information, wherein the subsequent utterance follows the one or more initial utterances in time; transmitting, by the computing system, the first audio data to the interactive voice system via a first communication channel; obtaining, by the computing system, second audio data representing the subsequent utterance; determining, by the computing system, based on the prediction, whether to transmit the second audio data to the interactive voice system via a first communication channel; and based on a determination not to transmit the second audio data to the interactive voice system via the first communication channel: transmitting, by the computing system, third audio data to the interactive voice system via the first communication channel in place of the second audio data; and transmitting, by the computing system, the second audio data to the server via a second communication channel that bypasses the interactive voice system.

Aspect 2: The method of aspect 1, wherein the computing system is a first computing system and the server comprises an application that operates on a second computing system that also implements the interactive voice system.

Aspect 3: The method of aspect 1, wherein the computing system is a first computing system, a second computing system implements the interactive voice system, and a third computing system separate from the first and second computing systems provides the server.

Aspect 4: The method of any of aspects 1 through 3, further includes obtaining, by the server, semantic content of the third audio data from the interactive voice system; determining, by the server, that the semantic content of the third audio data corresponds to the second audio data; and performing, by the server, an action based on the second audio data instead of the third audio data.

Aspect 5: The method of aspect 4, wherein: the method further comprises: sending, by the computing system, the third audio data to the server via the second communication channel; generating, by the server, a mapping of the second audio data and the semantic content of the third audio data, and determining that the third audio data corresponds to the second audio data comprises determining, by the server, based on the mapping, that the semantic content of the third audio data corresponds to the second audio data.

Aspect 6: The method of any of aspects 1 through 5, wherein the third audio data is based on a voice of the user.

Aspect 7: The method of any of aspects 1 through 6, wherein the method further comprises: obtaining, by the computing system, a timed volatile random subset (t-VRS) for the interactive voice session from the server; and generating the third audio data based on words in the t-VRS for the interactive voice session.

Aspect 8: A system includes a first computing system includes obtain first audio data representing one or more initial utterances during an interactive voice session with an interactive voice system and that interacts with the server to obtain content to provide to a user during the interactive voice session; generate, based on the first audio data, a prediction regarding whether a subsequent utterance of the user in the interactive voice session will contain sensitive information, wherein the subsequent utterance follows the one or more initial utterances in time; obtain second audio data representing the subsequent utterance; determine, based on the prediction, whether to transmit the second audio data to the interactive voice system via first communication channel; and based on a determination not to transmit the second audio data to the interactive voice system via the first communication channel: transmit third audio data to the interactive voice system via the first communication channel in place of the second audio data; and transmit, the second audio data to the server via a second communication channel that bypasses the interactive voice system.

Aspect 9: The system of aspect 8, wherein the server comprises an application that operates on the second computing system.

Aspect 10: The system of any of aspects 8 and 9, wherein a third computing system separate from the first and second computing systems provides the interactive voice system.

Aspect 11: The system of any of aspects 8 through 10, wherein the server is configured to: obtain semantic content of the third audio data from the interactive voice system; determine that the semantic content of the third audio data corresponds to the second audio data; and perform an action based on the second audio data instead of the third audio data.

Aspect 12: The system of aspect 11, wherein: the one or more first processors are further configured to send the third audio data to the server the server via the second communication channel; the server is further configured to generate a mapping of the second audio data and the semantic content of the third audio data, and the server is configured to, as part of determining that the third audio data corresponds to the second audio data, determine, based on the mapping, that the semantic content of the third audio data corresponds to the second audio data.

Aspect 13: The system of any of aspects 8 through 12, wherein the third audio data is based on a voice of the user.

Aspect 14: The system of any of aspects 8 through 13, wherein the interactive voice system is a voice assistant system.

Aspect 15: The system of any of aspects 8 through 14, wherein the one or more processors of the first computing system are configured to: obtain a timed volatile random subset (t-VRS) for the interactive voice session from the server; and generate the third audio data based on words in the t-VRS for the interactive voice session.

Aspect 16: The system of aspect 15, wherein the server is configured to transmit refreshed t-VRS's to the guardian system at configured intervals or in response to an event.

Aspect 17: A non-transitory computer-readable storage medium includes obtain first audio data representing one or more initial utterances during an interactive voice session with an interactive voice system that interacts with a server to obtain content to provide to a user during the interactive voice session; generate, based on the first audio data, a prediction regarding whether a subsequent utterance of the user in the interactive voice session will contain sensitive information, wherein the subsequent utterance follows the one or more initial utterances in time; obtain second audio data representing the subsequent utterance; determine, based on the prediction, whether to transmit the second audio data to the interactive voice system via first communication channel; and based on a determination not to transmit the second audio data to the interactive voice system via the first communication channel: transmit third audio data to the interactive voice system via the first communication channel in place of the second audio data; and transmit the second audio data to the server via a second communication channel that bypasses the interactive voice system.

Aspect 18: The non-transitory computer-readable storage medium of aspect 17, wherein the computing system is a first computing system, a second computing system implements the interactive voice system, and a third computing system separate from the first and second computing systems provides the server.

Aspect 19: The non-transitory computer-readable storage medium of any of aspects 17 and 18, wherein the instructions, when executed, cause the processing circuitry of the computing system to: obtain a timed volatile random subset (t-VRS) for the interactive voice session from the server; and generate the third audio data based on words in the t-VRS for the interactive voice session.

Aspect 20: The non-transitory computer-readable storage medium of any of aspects 17 through 19, wherein the third audio data is based on a voice of the user.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers, processing circuitry, or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM, or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by processing circuitry (e.g., one or more processors, such as one or more DSPs, general purpose microprocessors, ASICs, FPGAs, or other equivalent integrated or discrete logic circuitry), as well as any combination of such components. Accordingly, the term "processor" or "processing circuitry" as used herein, may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A computer-implemented method comprising:
    obtaining, by one or more processors of a first computing system, first audio data representing one or more initial utterances during an interactive voice session with an interactive voice system that interacts with a server to obtain content to provide to a user during the interactive voice session, wherein the interactive voice system is configured to execute on a second computing system and the server is configured to execute on a third computing system;
    transmitting, by the one or more processors of the first computing system, the first audio data to the interactive voice system via a first communication channel;
    generating, by the one or more processors of the first computing system, based on the first audio data, a prediction that a second audio data representing a subsequent utterance of the user in the interactive voice session will contain sensitive information, wherein the subsequent utterance follows the one or more initial utterances in time;
    upon obtaining, by the one or more processors of the first computing system, the second audio data that includes the sensitive information:
        transmitting, by the one or more processors of the first computing system, third audio data to the interactive voice system via the first communication channel in place of the second audio data, wherein the third audio data represents data that replaces the sensitive information; and
        transmitting, by the one or more processors of the first computing system, the second audio data to the server via a second communication channel that bypasses the interactive voice system.

2. The computer-implemented method of claim 1, wherein:
the interactive voice system is configured to provide semantic content of the third audio data to the server, and
the server is configured to determine that the semantic content of the third audio data corresponds to the second audio data and perform an action based on the second audio data instead of the third audio data.

3. The computer-implemented method of claim 2, further comprising:
sending, by the one or more processors of the first computing system, the third audio data to the server via the second communication channel, and causing the server to (1) generate a mapping of the second audio data and the semantic content of the third audio data, and (2) determine, based on the mapping, that the semantic content of the third audio data corresponds to the second audio data.

4. The computer-implemented method of claim 1, wherein the third audio data is based on a voice of the user.

5. The computer-implemented method of claim 1, further comprising:
obtaining, by the one or more processors of the first computing system, a timed volatile random subset (t-VRS) for the interactive voice session from the server; and
generating, by the one or more processors of the first computing system, the third audio data based on words in the t-VRS for the interactive voice session.

6. A computing system comprising:
memory; and
one or more processors implemented in circuitry and communicatively coupled to the memory, the one or more processors configured to:
obtain first audio data representing one or more initial utterances during an interactive voice session with an interactive voice system and that interacts with a server to obtain content to provide to a user during the interactive voice session, wherein the computing system is a first computing system, the interactive voice system is configured to execute on a second computing system and the server is configured to execute on a third computing system;
transmit the first audio data to the interactive voice system via a first communication channel;
generate, based on the first audio data, a prediction that a second audio data representing a subsequent utterance of the user in the interactive voice session will contain sensitive information, wherein the subsequent utterance follows the one or more initial utterances in time;
upon obtaining the second audio data that includes the sensitive information:
transmit third audio data to the interactive voice system via the first communication channel in place of the second audio data, wherein the third audio represents data that replaces the sensitive information; and
transmit, the second audio data to the server via a second communication channel that bypasses the interactive voice system.

7. The computing system of claim 6, wherein the server comprises an application configured to operate on the third computing system.

8. The computing system of claim 6, wherein:
the interactive voice system is configured to provide semantic content of the third audio data, and
the server is configured to determine that the semantic content of the third audio data corresponds to the second audio data and perform an action based on the second audio data instead of the third audio data.

9. The computing system of claim 8, wherein:
the one or more processors are further configured to send the third audio data to the server via the second communication channel, causing the server to (1) generate a mapping of the second audio data and the semantic content of the third audio data, and (2) determine, based on the mapping, that the semantic content of the third audio data corresponds to the second audio data.

10. The computing system of claim 6, wherein the third audio data is based on a voice of the user.

11. The computing system of claim 6, wherein the interactive voice system is a voice assistant system.

12. The computing system of claim 6, wherein the one or more processors of the first computing system are further configured to:
obtain a timed volatile random subset (t-VRS) for the interactive voice session from the server; and
generate the third audio data based on words in the t-VRS for the interactive voice session.

13. The computing system of claim 12, wherein the one or more processors are further configured to receive refreshed t-VRS's from the server at configured intervals or in response to an event.

14. One or more non-transitory computer-readable storage media including instructions that, when executed by the one or more processors, cause the one or more processors of a first computing system to:
obtain first audio data representing one or more initial utterances during an interactive voice session with an interactive voice system that interacts with a server to obtain content to provide to a user during the interactive voice session, wherein the interactive voice system is configured to execute on a second computing system and the server is configured to execute on a third computing system;
transmit the first audio data to the interactive voice system via a first communication channel;
generate, based on the first audio data, a prediction that a second audio data representing a subsequent utterance of the user in the interactive voice session will contain sensitive information, wherein the subsequent utterance follows the one or more initial utterances in time;
upon obtaining the second audio data that includes the sensitive information:
transmit third audio data to the interactive voice system via the first communication channel in place of the second audio data, wherein the third audio data represents data that replaces the sensitive information; and
transmit the second audio data to the server via a second communication channel that bypasses the interactive voice system.

15. The one or more non-transitory computer-readable storage media of claim 14, wherein the instructions further cause the one or more processors of the computing system to:
obtain a timed volatile random subset (t-VRS) for the interactive voice session from the server; and
generate the third audio data based on words in the t-VRS for the interactive voice session.

16. The one or more non-transitory computer-readable storage media of claim 14, wherein the third audio data is based on a voice of the user.

\* \* \* \* \*